United States Patent [19]

Stamper

[11] 4,107,459
[45] Aug. 15, 1978

[54] DATA PROCESSOR ANALYZER AND DISPLAY SYSTEM

[75] Inventor: Jerry Lee Stamper, San Diego, Calif.

[73] Assignee: Conic Corporation, San Diego, Calif.

[21] Appl. No.: 797,188

[22] Filed: May 16, 1977

[51] Int. Cl.² .......................................... H04L 7/00
[52] U.S. Cl. ................................................ 178/69.1
[58] Field of Search ........................ 178/68, 69.1; 340/146.1 AG, 146.1 AQ, 146.1 AV; 364/900 MS File

[56] References Cited

U.S. PATENT DOCUMENTS

| | | | |
|---|---|---|---|
| 3,735,045 | 5/1973 | Clark | 178/69.1 |
| 3,766,316 | 10/1973 | Hoffman et al. | 178/69.1 |
| 3,792,443 | 2/1974 | Breikss | 178/69.1 |
| 3,808,367 | 4/1974 | Wigner et al. | 178/69.1 |
| 3,903,504 | 9/1975 | Rogers et al. | 178/69.1 |
| 3,906,367 | 9/1975 | Hoeschele, Jr. et al. | 178/69.1 |
| 3,921,147 | 11/1975 | Fuhr et al. | 364/200 |
| 4,029,900 | 6/1977 | Addeo | 178/69.1 |

OTHER PUBLICATIONS

Computer Controlled Word Selector, DCS Model 4270 Manual, Data–Control Systems, Inc., Danbury, Conn.
Format Synchronizer, DCS Model 4170 Manual, Data Conrol Systems, Inc., Danbury, Conn.
Card Reader, PCM Word Selector, DIA Converter and Display, Model 4211 Manual, Data Conrol Systems, Inc., Danbury, Conn.
Word Selector, Mode 4230 Manual, Data Control Systems, Inc., Danbury, Conn.
PCM Format Simulator Model 4301, Data–Control Systems, Inc. Manual, Danbury, Conn.
PCM Decommutator Subsystems, Models 4003 and 4004 Manual, Data Control Systems, Inc. Danbury, Conn.
Single Channel PCM Decommutator, Model 1023 A Manual.
Aydin Data Systems/Monitor Systems, Ft. Washington, Penn. (Jan., 1975).

*Primary Examiner*—Gareth D. Shaw
*Assistant Examiner*—Michael C. Sachs
*Attorney, Agent, or Firm*—Brown & Martin

[57] ABSTRACT

A system for distinguishing a digital signal in a received serial bit stream signal, and for displaying data represented by the distinguished digital signal is disclosed. The system is contained in a single console. The bits represent data in an original digital signal having a predetermined bit rate, a predetermined number of bits per word, a predetermined number of words per frame, and a predetermined number of frames per subframe, with there being a predetermined synchronizing code word in each frame for defining the frame. The system includes a processing network for processing the received signal to reconstruct the bits, to recognize the code word from the recognized bits, and to define the frames in response to recognition of the code word to thereby distinguish a digital signal having the predetermined number of bits per word, the predetermined number of words per frame, and the predetermined number of frames per subframe. A keyboard device is coupled to the processing network for enabling an operator to indicate the predetermined bit rate, the predetermined number of bits per words, the predetermined number of words per frame, the predetermined number of frames per subframe, and the predetermined code word to the processing network for programming the processing network to distinguish the digital signal. A cathode ray tube is coupled to the processing network for providing an instant visual feedback from the processor to the operator during operation of the keyboard device, of the programming indications that are indicated to the processing network by operation of the keyboard device and for providing a visual display of data represented by the distinguished digital signal. A tape recorder is coupled to the processing network for recording the programming indications that are provided to the processing network by operation of the keyboard device.

23 Claims, 25 Drawing Figures

```
                              1
          BIT SYNCHRONIZER
>   CLOCK SOURCE          INTERNAL
    CLOCK POLARITY        POSITIVE
    DATA SOURCE           SIM
    BIT RATE              10.00 EE 4
    TRACK RANGE           10.0 %
    LOOP BANDWIDTH        6.0 % MAN.
    BIT ERROR RATE:
        (ALARM SET)       00.00
```

Fig. 15

```
                                    2
           FRAME SYNCHRONIZER
      BITS/WORD ——————————08
>     WORDS/FRAME ———————— 032
      PARITY ——————————— NONE
      DATA CODE ——————— NRZ-L
      DATA POLARITY ———— NORMAL
      DATA ALIGNMENT ————— MSB FIRST
      FRAME SYNC CODE ———— 111110011 0
                           101000 0111
                           10XXXXXXXX
      SYNC STRATEGY:
          SEARCH > LOCK ———— 04 CORRECT
          LOCK > SEARCH ———— 04 ERRORS
```

Fig. 16

```
                                                        3
              SUBFRAME SYNCHRONIZER

FRAMES  SUBFRAME ————— Ø32
>      SYNC  METHOD —————— SFID
       SYNC  LOCATION:
              BIT ———————— Ø2
              WORD ——————— ØØ4
       STARTING-ID ——————— ØØØ
       COUNT  DIRECTION —————UP
       SYNC  CODE ——————— XXXXXXXXXX
                                  XXXXXXXXXX
                                  XXXXXXXXXX
       SYNC  STRATEGY:
              SEARCH  LOCK ————— Ø4 CORRECT
              LOCK  SEARCH ————— Ø4 ERRORS
```

Fig. 17

```
                                                        4
              PCM  SIMULATOR

COMMON WORD VALUE     1Ø1Ø1Ø1ØØØØØØØØØ
>      SPECIAL WORD VALUE    ØØØØ1111ØØØØØØØØ

SPECIAL WORD LOCATION:
              STARTING WORD       ØØ7
              WORD INCREMENT      ØØØ
              STARTING FRAME      ØØØ
              FRAME INCREMENT     ØØ1
```

Fig. 18

```
                                                            5
                    DIAGNOSTIC
          DATA  FREQUENCY--------99.99 EE 3
          BIT  ERROR  RATE  ------ØØ.ØØ

BIT  SYNC  STATUS  -----LOCK
          FRAME  SYNC  STATUS  ---LOCK
          SUBFRAME  SYNC  ------LOCK

TAPE  ERROR  MESSAGE  ---NONE
    >     FILE  NUMBER  -------ØØ1
          CONTINUE  TO  FILE  -----ØØ2
```

Fig. 19

| ANALOG OUTPUT PORT | DATA LOCATION | | DATA INCREMENT 6 | |
|---|---|---|---|---|
| | WD. | FR. | WD. | FR. |
| > Ø1 | ØØ5 | ØØØ | ØØØ | ØØ1 |
| Ø2 | ØØ6 | ØØØ | ØØØ | ØØ1 |
| Ø3 | ØØ7 | ØØØ | ØØØ | ØØ1 |
| Ø4 | ØØ8 | ØØØ | ØØØ | ØØ1 |
| Ø5 | ØØ9 | ØØØ | ØØØ | ØØ1 |
| Ø6 | Ø1Ø | ØØØ | ØØØ | ØØ1 |
| Ø7 | Ø11 | ØØØ | ØØØ | ØØ1 |
| Ø8 | Ø12 | ØØØ | ØØØ | ØØ1 |
| Ø9 | Ø13 | ØØØ | ØØØ | ØØ1 |
| 1Ø | Ø14 | ØØØ | ØØØ | ØØ1 |
| 11 | Ø15 | ØØØ | ØØØ | ØØ1 |
| 12 | Ø16 | ØØØ | ØØØ | ØØ1 |

Fig. 20

| DATA LOCATION | | LOWER LIMIT | UPPER LIMIT | BINARY VALUE | 7 LIM |
|---|---|---|---|---|---|
| WD. | FR. | | | | |
| 000 | 000 | 00248 | 00248 | 11111000 | = |
| 001 | 000 | 00212 | 00212 | 11010100 | = |
| 002 | 000 | 00030 | 00030 | 00011110 | = |
| 003 | 000 | 00170 | 00170 | 10101010 | = |
| 004 | 000 | 00000 | 00000 | 00000000 | = |
| 005 | 000 | 00170 | 00170 | 10101010 | = |
| 006 | 000 | 00170 | 00170 | 10101010 | = |
| 007 | 000 | 00015 | 00015 | 00001111 | = |
| 008 | 000 | 00170 | 00170 | 10101010 | = |
| 009 | 000 | 00170 | 00170 | 10101010 | = |
| 010 | 000 | 00170 | 00170 | 10101010 | = |
| 011 | 000 | 00170 | 00170 | 10101010 | = |

| DATA LOCATION | | PCT FULL SCALE | DEC. VALUE | BINARY VALUE | 8 LIM |
|---|---|---|---|---|---|
| WD. | FR. | | | | |
| 000 | 000 | 97.3 | 248 | 11111000 | = |
| 001 | 000 | 83.1 | 212 | 11010100 | = |
| 002 | 000 | 11.8 | 30 | 00011110 | = |
| 003 | 000 | 66.7 | 170 | 10101010 | = |
| 004 | 000 | | | 00000000 | = |
| 005 | 000 | 66.7 | 170 | 10101010 | = |
| 006 | 000 | 66.7 | 170 | 10101010 | = |
| 007 | 000 | 5.9 | 15 | 00001111 | = |
| 008 | 000 | 66.7 | 170 | 10101010 | = |
| 009 | 000 | 66.7 | 170 | 10101010 | = |
| 010 | 000 | 66.7 | 170 | 10101010 | = |
| 011 | 000 | 66.7 | 170 | 10101010 | = |

DATA PROCESSOR ANALYZER AND DISPLAY SYSTEM

BACKGROUND OF THE INVENTION

The present invention generally pertains to data processing systems and is particularly directed to a data processor analyzer and display system for distinguishing a digital signal in a received serial bit stream signal. The bits represent data in an original digital data signal having a predetermined bit rate, a predetermined number of bits per word, and a predetermined number of words per frame, with there being a predetermined synchronizing code word in each frame for defining frame. Some digital data signals are further organized to contain a predetermined number of frames per sub-frame.

In such a system, a processing network processes the received signal to reconstruct the bits in the bit stream, to recognize the code word from the reconstructed bits, and to define the frames in response to recognition of the code word to thereby distinguish a digital signal having the predetermined number of bits per word and the predetermined number of words per frame. The distinguished digital signal is provided at output terminals from which it may be provided to a computer for processing of the data represented by the distinguished digital signal. The distinguished digital signal also may be converted to analog signals and provided at analog output ports to such peripheral devices as strip chart recorders or printer/plotters.

A typical application for a data processor analyzer and display system is in a system for telemetering data from an aircraft. The original digital signal is produced by multiplexing a plurality of analog signals representative of various aspects of aricraft performance, converting the multiplexed analog signal to a digital signal, and code converting the digital signal into a serial bit stream. The original digital signal is transmitted from the aircraft to a ground station. The signal received at the ground station is processed by the data processor analyzer and display system to distinguish a digital signal corresponding to the original signal transmitted from the aircraft. Separate analog signals corresponding to the original analog signals are derived from the distinguished digital signal and provided at separate analog output ports that are designated to receive signals from predetermined word positions in the distinguished digital signal.

It is necessary that the processing network be programmed to receive indications of the predetermined bit rate, the predetermined number of bits per word, the predetermined number of words per frame, and the predetermined code word that correspond to the original digital signal so as to enable the processing network to distinguish the digital signal from the received bit stream. An operator typically provides such indications to the processing network by such means as punch cards or tape or manually controlled switches. With prior art systems the programming operation is quite time consuming.

The system also includes display devices for providing a visual display of data represented by the distinguished digital signal and also a visual display of the programming indications provided by the operator to the processing network. Such display devices typically are dials or digital display devices that are limited in format and capacity as to the variety of data and programming indications that can be displayed.

Typical prior art data processor analyzer and display systems may also include sub-systems that individually perform such functions as synchronizing the recognized stream of bits with an internally generated clock signal, synchronizing a sequence of frames within a sub frame, selecting particular data words for display or for transmission from a designated output terminal, code converting the serial bit stream, converting the distinguished digital signal to an analog signal(s), internally simulating a serial bit stream, in accordance with the programming indications for test purposes, and converting serial data signals to parallel data signals.

In a typical prior art system many of these functions are performed by separate consoles that are apart from a console in which the bit recognition and frame synchronization functions are performed. As a result, prior art data processor analyzer and display systems typically include a patchwork of several consoles which is inconvenient to position and complicated to operate.

SUMMARY OF THE INVENTION

The present invention is an improved system for distinguishing a digital signal in a received serial bit stream signal, wherein the bits represent data in an original digital signal having a predetermined bit rate, a predetermined number of bits per word, and a predetermined number of words per frame, with there being a predetermined synchronizing code word in each frame for defining the frame. The system according to the present invention includes a processing network for processing the received signal to reconstruct the bits, to recognize the code word from the reconstructed bits, and to define the frames in response to recognition of the code word, to thereby distinguish a digital signal having the predetermined number of bits per word and the predetermined number of words per frame; a keyboard device coupled to the processing network for enabling an operator to indicate the predetermined bit rate, the predetermined number of bits per words the predetermined number of words per frame and the predetermined code word to the processing network for programming the processing network to distinguish the digital signal, and a cathode ray tube (CRT) coupled to the processing network for providing an instant visual feedback from the processing network to the operator during operation of the keyboard device, of the programming indications that are indicated to the processing network by operation of the keyboard device, and for providing visual display of data represented by the distinguished digital signal. In accordance with the present invention this system is contained in a single console.

In the preferred embodiment, the present invention is characterized by several additional features, as follows.

The cathode ray tube is coupled to the processing network for displaying the programming indications and the data in a multiple page format. This enables all of the functions of the system to be readily controlled and quickly programmed with a signal keyboard device, and for all of the functions to be provided by a system that is contained within a single console.

A tape recorder is coupled to the processing network for recording the programming indications that are provided to the processing network by operation of the keyboard device. The processing network includes a random access memory (RAM) for storing the programming indications that are provided to the processing network by operation of the keyboard device. The tape recorder is coupled to the RAM for recording programming indications that are stored in the RAM. The tape recorder may also be used for storing the RAM programming instructions that were previously recorded on the recording tape. The recording tape may be recorded to include a plurality of files for containing separate sets of programming indications corresponding to serial bit stream signals received from different signal sources. The processor is coupled to the tape recorder and the keyboard device to enable the operator to select a predetermined file of recorded programming indications by operation of the keyboard device.

A unique system is described herein for reconstructing the bits in the received serial bit stream.

There also is described herein a novel system for reconstructing a serial bit stream that is noise contaminated to be free of noise.

Another feature of the present invention is a novel system for synchronizing an internal clock signal with the reconstructed serial bit stream.

A unique system for locking the frequency of the internal clock signal to the frequency of the reconstructed serial bit stream also is disclosed.

In addition there is described a unique system for recognizing the predetermined synchronizing code word.

These features of the present invention are described in greater detail in the Description of the Preferred Embodiment.

BRIEF DESCRIPTION OF THE DRAWING

FIG. 15 shows a CRT page display related to programming of the bit synchronizer.

FIG. 16 shows a CRT page display related to programming of the frame synchronizer.

FIG. 17 shows a CRT page display related to programming of the subframe synchronizer.

FIG. 18 shows a CRT page display related to the provision of a simulated serial bit stream constructed in accordance with the programming indications provided to the processor.

FIG. 19 shows a CRT page display of diagnostic data related to the processing of the serial bit stream.

FIG. 20 shows a CRT page display related to providing data from selected word locations at designated analog output ports.

DESCRIPTION OF THE PREFERRED EMBODIMENT

Figure 1:
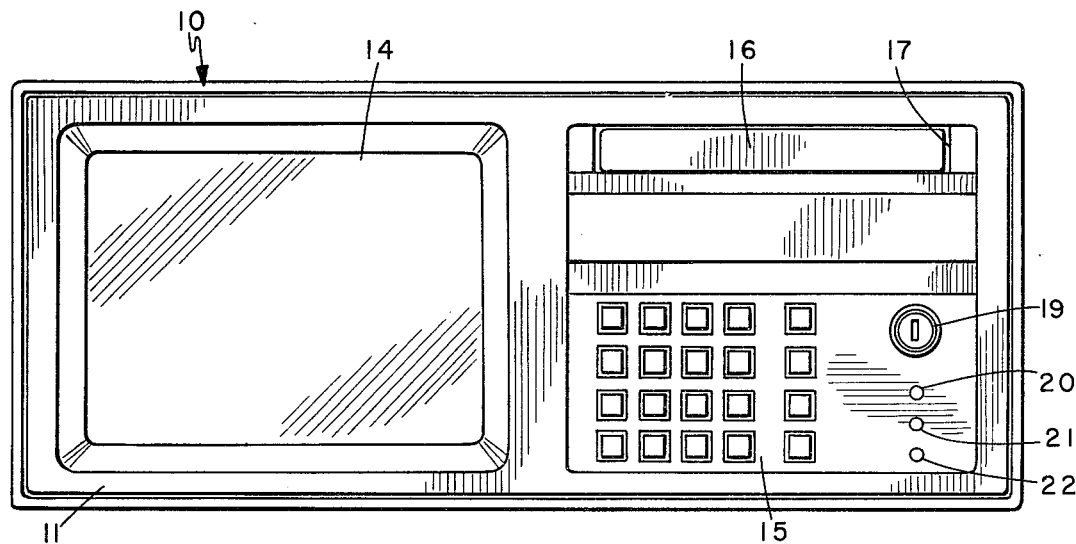
FIG. 1 is a plan view of the front panel of a console containing a data processor analyzer and display system according to the present invention.
Figure 2:
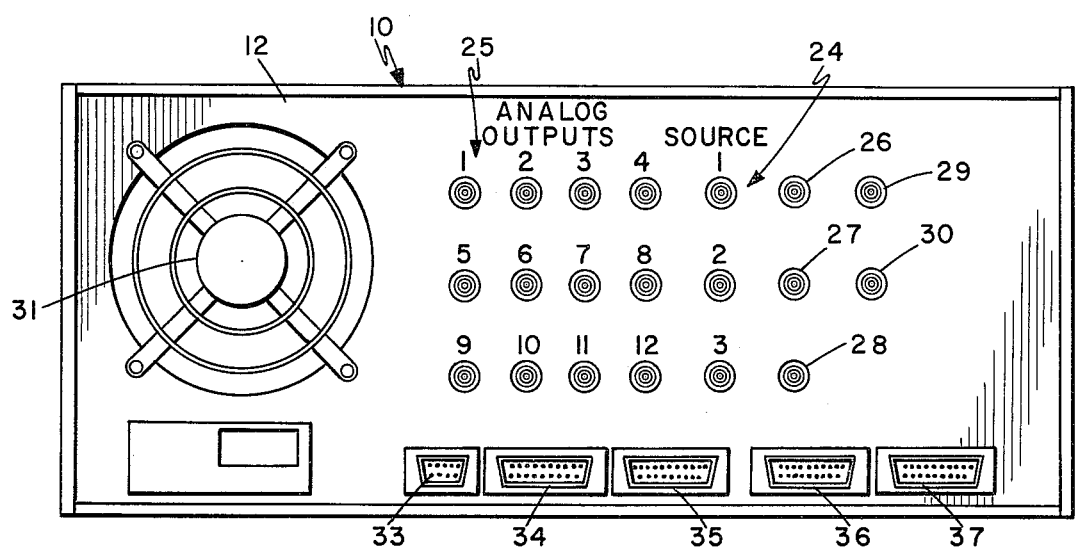
FIG. 2 is a plan view of the rear panel of the console of FIG. 1.

The preferred embodiment of the system according to the present invention is designed to process a pulse code modulated (PCM) serial bit stream. The entire system is housed in a single console 10 having a front panel 11 (FIG. 1) and a rear panel 12 (FIG. 2).

The system includes a cathode ray tube (CRT) 14, a keyboard device 15, a processing network (FIG. 3) and a tape recorder. A magnetic recording tape data cartridge 16 is shown in FIG. 1 as loaded in the tape recorder drive mechanism through an opening 17 in the front panel 11 of the console 10.

All local programming of both digital signal formation and data display functions is accomplished through use of the pushbutton matrix of the keyboard device 15. The particular operations controlled by the various pushbuttons is described hereinafter with reference to FIG. 14.

The system includes an on/off switch 19 on the front panel 11 that is operated by a key. This feature prevents inadvertent or accidental loss of power during programming procedures, and thus eliminates a potential source of lost time.

The cathode ray tube 14 is the only display medium which is an integral part of the system, although the interface connectors on the rear panel 12 allow other types of local or remote display devices to be used.

The front panel 11 also includes three indicator lights 20, 21, 22. The "run" indicator light 20 is illuminated when the system is being operated. The "lock" indicator light 21 is illuminated when the system has achieved bit, frame, and subframe synchronization of the bit stream to thereby distinguish the digital signal. The alarm indicator light 22 is illuminated when any of several different abnormal conditions occur. These abnormal conditions are discussed hereinbelow following the description of the entire system.

All external connections, power, data and clock inputs and outputs and interface lines are provided at the rear panel 12. There are three "source" input ports 24, numbered "1", "2", and "3" at which serial bit streams of data may be received by the system from three different sources.

There are 12 "analog output" ports 25, numbered "1" through "12" at which analog output signals derived from the distinguished digital signal may be provided.

A "clock input" port 26 may be utilized when an external clock signal synchronized with the serial bit stream in the received signal is available.

The "sim data" port 27 is an output port at which a serial bit stream that is internally simulated in accordance with the programming indications is provided.

The "BIO-L" port 28 is an output port for providing a reproduction of the received serial bit stream in a BIO-L format. When the received serial bit stream already is in the BIO-L format, the signal provided at the "BIO-L" port 28 is identical to the received bit stream except for time displacement.

The "NRZ-L" port 29 is an output port for providing a reproduction of the received serial bit stream in a NRZ-L format. When the received bit stream already is in the NRZ-L format, the signal provided at the "NRZ-L" port 29 is identical to the received bit stream except for time displacement.

The "bit clock" port 30 is an output port for providing an internally generated bit clock signal which is extracted from the serial bit stream being processed. The bit clock signal may be utilized for diagnostic or synchronization purposes.

The rear panel 12 also includes a fan 31 which provides forced air cooling for the system.

In addition, the rear panel 12 contains a number of interface connector terminals 33, 34, 35, 36, and 37. These include D-subminiature type pin connectors. Connector terminal 33 is a nine pin connector terminal for interface with a teletype system. Connector terminal 34 is a 24 pin connector terminal for providing word and frame locations for each parallel data word derived from the distinguished digital signal. Connector terminal 35 is a 24 pin connector terminal for providing an input/output interface with a computer. Connector terminal 36 is a 24 pin connector terminal providing a peripheral buss extention port. Connector terminal 37 is a 24 pin connector terminal for providing word, frame, and subframe sync outputs along with parity information and also 16 parallel data output lines.

Figure 3:
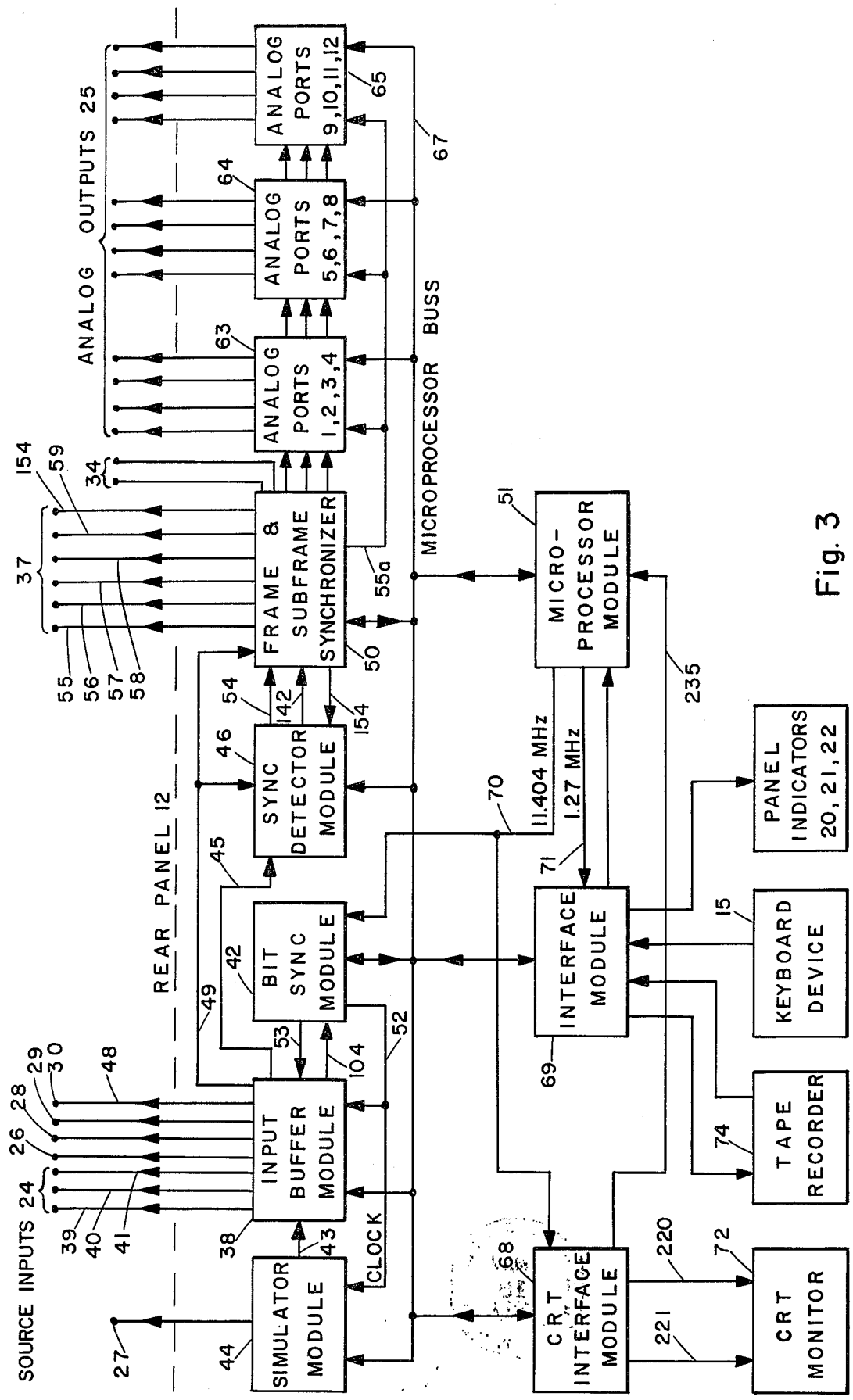
FIG. 3 is a block diagram of a preferred embodiment of the system according to the present invention.

A block diagram of the preferred embodiment of the data processor analyzer and display system is shown in FIG. 3. The processing network includes an input buffer module 38, a bit sync module 42, a sync detector module 46, a frame subframe synchronizer 50 and an microprocessor module 51.

A serial bit stream is received by the input buffer module 38 on input lines 39, 40, or 41 from the source input ports "1", "2", or "3" respectively on the rear panel 12. Alternatively the input buffer module 38 may receive a simulated serial bit stream on line 43 from the simulator module 44. The input buffer module 38 receives a noise contaminated serial bit stream on line 39, 40, or 41 and provides a reconstructed serial bit stream that is free of noise on line 45 to the sync detector module 46.

The input buffer module also provides a bit clock on line 48 to port 30 on the rear panel 12 and on line 49 to the sync detector module 46 and the frame and subframe synchronizer module 50.

The bit sync module 42 also operates in conjunction with the input buffer module 38 to enable the input buffer module 38 to provide the reconstructed serial bit stream on line 45 and the bit clock signal on lines 48 and 49.

The bit sync module 42 provides an internal clock signal on line 52 that is synchronized with a predetected data signal derived from the noise contaminated serial bit stream by the input buffer module 38 and provided to the bit sync module 42 on line 53.

The sync detector module 46 accepts the reconstructioned serial bit stream on line 45, recognizes the predetermined synchronizing code word, and acts in conjunction with the frame and subframe synchronizer 50 to define the frames of the distinguished digital signal. The reconstructed serial bit stream received by the sync detector module 46 on line 45 is throughput to the frame and subframe synchronizer 50 on line 54.

The frame and subframe synchronizer 50 combines the bit clock signal on line 49 with the reconstructed serial bit stream on line 54 to provide 16 bit parallel PCM data signals on lines 55 to connector terminal 37 on the rear panel 12. The parallel PCM data signals are formed in accordance with the programming indications provided from the keyboard device 15 by the operator. The synchronizer 50 also provides a subframe sync pulse on line 56, a frame sync pulse on line 154, a word sync pulse on line 57, a lock bit on line 58, and two parity bits on lines 59 to the 24 connector terminal 37 on the back panel 12. The synchronizer 50 further provides an 8 bit frame number identification signal on line 60 and an 8 bit word number identification signal on line 61, both being connected to connector terminal 34 on the rear panel 12.

Three analog port modules 63, 64, and 65 receive the parallel PCM data signal from the synchronizer 50 via lines 55a. These are the same signals as are provided on line 55. Each analog port module 63, 64, 65 contains four discrete analog signal circuits for providing analog signals to the analog output ports 25. Each discrete circuit functions as a data selector and as a digital to analog converter.

The microprocessor module 51 is coupled by means of data, control and address busses 67 to the simulator module 44, the input buffer module 38, the bit sync module 42, the frame and subframe synchronizer 50, the analog port modules 63, 64, 65, the CRT interface module 68 and the interface module 69. The operation of the entire system is controlled by the microprocessor module 69 by means of control signals provided on the busses 67 in accordance with the programming indications provided from the keyboard device 15 by the system operator. The microprocessor module 51 also accumulates data from the frame and subframe synchronizer 50 to provide data displays on the CRT 14. In addition, the microprocessor module 51 provides basic system clock signals of 11.404 MHz on line 70 to the bit sync module and to the CRT interface module 68, and of 1 MHz on line 71 to the interface module 69. The internal clock signal provided by the bit sync module on line 52 is derived from the 11.404 MHz clock signal provided on line 70 by the microprocessor module 51.

A CRT monitor 72 containing the cathode ray tube 15 displays data provided by the microprocessor module 51 via the buss 67 and the CRT interface module 68. The CRT dot pattern is clocked by the 11.404 MHz signal received by the CRT interface module 68 on line 70 from the microprocessor module 51.

The microprocessor module 51 is coupled through the interface module 69 to a tape recorder 74, the keyboard device 15 and the panel indicator lights 20, 21, and 22. The tape recorder 74 utilizes "Scotch" brand DC 300 A data cartridges as the recording medium in the storage and retrieval of data.

Certain ones of the modules included in the system shown in FIG. 3 now will be discussed in greater detail.

Figure 4:
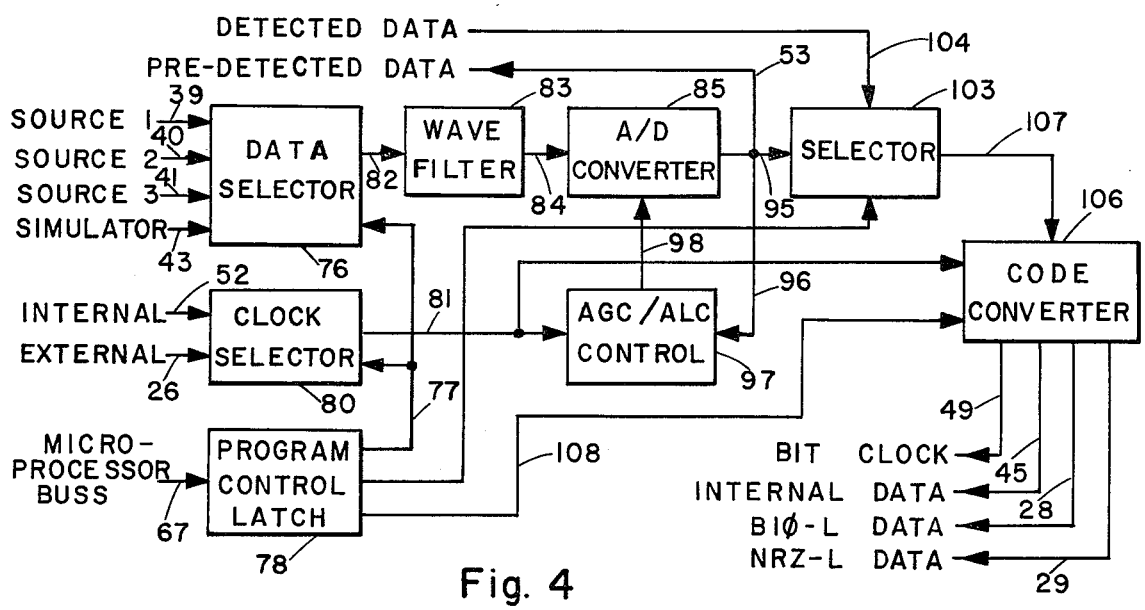
FIG. 4 is a block diagram of the input buffer module included in the system of FIG. 3.

Referring to FIG. 4, the input buffer module 38 includes a data selector switch 76, which selects the source of the serial bit stream to be processed from either the source No. 1 input port via line 39, the source No. 2 input via line 40, the source No. 3, input port via line 41 or the simulator module 44 via line 43. The data selector switch 76 is operated in accordance with a signal on buss 77 received from the microprocessor module 51 via a program control latch circuit 78 and microprocessor buss 67.

A clock selector switch 80 selects either an internal clock signal from line 52 or an external clock signal from line 26 in accordance with a signal on buss 77 received from the microprocessor module 51 via the program control latch circuit 78 and the microprocessor buss 67. The selected clock signal is provided on line 81. The polarity of the clock signal on line 81 is controlled by the clock selector switch 80 in accordance with a programming indication provided from the microprocessor module 51 via the buss 77, the program control latch circuit 78 and the buss 67.

A serial bit stream received on whichever one of the source lines 39, 40, 41, 43 is selected by the data selector switch 76, is provided on line 82 to a wave filter 83. The serial bit stream on line 82 is contaminated by noise. The wave filter 83 filters out high frequency noise components above approximately 2 MHz. Nevertheless, the serial bit stream provided by the wave filter 83 on line 84 is still contaminated by noise at lower frequencies.

The serial bit stream on line 84 is reconstructed by analog to digital (A/D) converter 85 to be in a digital format for further processing. The A/D converter includes three comparator circuits 87, 88, 89 and an amplifier circuit 90 which are connected together as shown in FIG. 24.

The noise contaminated serial bit stream on line 84 is received by the amplifier circuit 90 which provides signals on lines 91, 92, and 93 respectively in accordance with the detected positive and negative peak voltage levels of the serial bit stream signal on line 84. A reference signal having a level representing the RMS value of the positive peak voltage of the serial bit stream signal received on line 84 is provided on line 91 to the first comparator 87. This signal on line 91 nominally represents a binary one in the bit stream on line 84. When the bits in the bit stream are recognized and the system is in "lock," a reference signal having a level representing the RMS value of the negative peak voltage of the serial bit stream on line 84 is provided on line 93 to the third comparator 89. This signal on line 93 nominally represents a binary zero. Line 92 from the amplifier circuit 90 is connected to the second comparator 88 and is biased between lines 91 and 93 by two resistors R1 and R2 of equal value. Thus there is provided on line 92 to the second comparator 88 a reference signal having a level that is half way between the respective levels of the reference signals on lines 91 and 93, and thereby equal to the average of the levels of the reference signals on lines 91 and 93. The serial bit stream on line 84 is provided to one input of each of the comparators 87, 88, 89, as shown in FIG. 24. The reconstructed bit stream is provided from the output of the second comparator 88 on line 95 when the input buffer module 38 is clocked by the external clock signal on line 26.

The output signals from the comparators 87, 88, 89 on lines 96a, 96b, and 96c are examined by an automatic gain control/automatic level control (AGC/ALC) circuit 97 which in turn provides control signals on lines 98 to the A/D converter to effect an adjustment in the gain provided by the amplifier circuit 90 and the levels of the reference signals provided on lines 91, 92, 93. Such adjustments are made whenever the examination of the output signals reveals that the positive and negative voltage peaks represented by the levels of the reference signals on lines 91 and 93 and occuring at the predetermined bit rate do not correspond to the positive and negative peaks of the serial bit stream on line 84 that occur at the predetermined bit rate.

Figure 24:
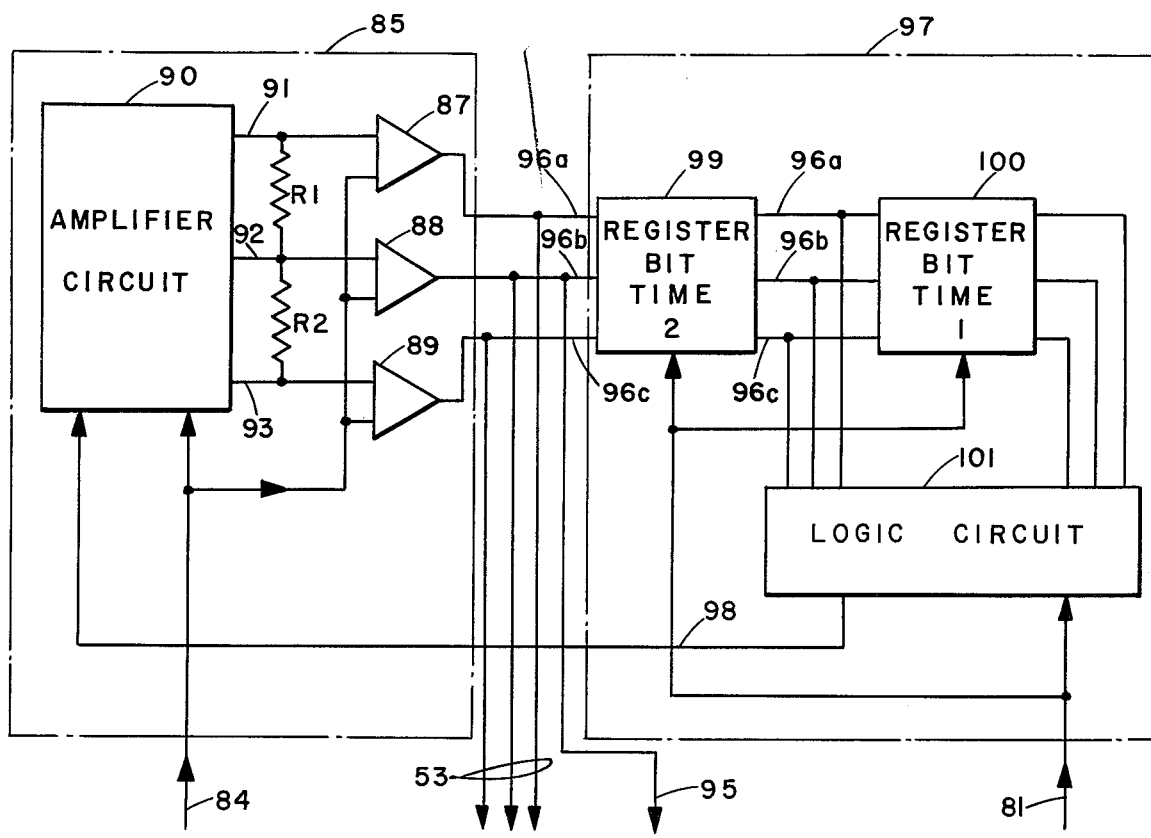
FIG. 24 is a block diagram of the analog to digital converter and the automatic gain control/automatic level control circuit included in the input buffer module of FIG. 4.

Referring to FIG. 24, the AGC/ALC control circuit 97 includes a first register 99, a second register 100 and a logic circuit 101.

The comparator output signals on lines 96a, 96b, and 96c from comparators 87, 88, and 89 respectively are temporarily stored in the first register 99 and the second register 100 at bit times "2" and "1" respectively. The bit times are determined by the clock signal on line 81. The logic circuit 101 responds to the clock signal on line 81 by examining the comparator output signals in registers 99 and 100 at the midpoint of each bit period and providing control signals on lines 98 to the amplifier circuit 90 in order to make whatever adjustments are necessary to correct for errors.

EXAMPLE NO. 1

| Comparator | 87 | 88 | 89 |
|---|---|---|---|
| Bit Time "1" | 0 | 0 | 0 |
| Bit Time "2" | 1 | 1 | 1 |

The combination of comparator output signals at bit time "1" indicates that the voltage level of the bit stream is then lower than the level of the reference signal on line 93 to the comparator 89. The combination of comparator output signals at bit time "2" indicates that the voltage level of the bit stream is then higher than the level of the reference signal on line 91 to the comparator 87. This combination of samples taken at bit times "1" and "2" indicates to the logic circuit 101 that there is a gain error, in that the voltage difference between the DC reference signals on lines 91 and 93 respectively is less than the peak to peak voltage of the true serial bit stream signal on line 84. To adjust for this gain error, the logic circuit 101 provides a signal on line 98 to the amplifier circuit 90 to increase the voltage difference between the levels of the DC reference signals on lines 91 and 93 while maintaining the DC reference signal on line 92 at the same level.

EXAMPLE NO. 2

| Comparator | 87 | 88 | 89 |
|---|---|---|---|
| Bit Time "1" | 0 | 0 | 1 |
| Bit Time "2" | 0 | 1 | 1 |

The combination of comparator output signals at bit time "1" indicates that the voltage level of the bit stream is then lower than the level of the reference signal on line 92 and higher than the level of the reference signal on line 93. The combination of comparator output signals at bit time "2" indicates that the voltage level of the bit stream is then higher than the level of the reference signal on line 92 and lower than the level of the reference signal on line 91. This combination of samples taken at bit times "1" and "2" indicates to the logic circuit 101 that there is a gain error in that the voltage difference between the reference signals on lines 91 and 93 respectively is greater than the peak to peak voltage of the true bit stream signal on line 84. To adjust for this gain error, the logic circuit 101 provides a signal on line 98 to the amplifier circuit 90 to decrease the voltage difference between the levels of the reference signals on lines 91 and 93 while maintaining the reference signal on line 92 at the same level.

EXAMPLE NO. 3

| Comparator | 87 | 88 | 89 |
|---|---|---|---|
| Bit No. "1" | 0 | 0 | 0 |
| Bit No. "2" | 0 | 0 | 0 |

The combination of comparator output signals taken at bit times 1 and 2 indicates to the logic circuit 101 that the voltage level of the reference signal on line 93 is higher than the negative peak voltage of the true bit stream on line 84. This is an offset error which is adjusted by the logic circuit 101 providing a control signal on line 98 to the amplifier circuit 90 to cause the voltage levels of the reference signals on lines 91, 92, and 93 to all be lowered by the same amount.

EXAMPLE NO. 4

| Comparator | 87 | 88 | 89 |
|---|---|---|---|
| Bit No. "1" | 1 | 1 | 1 |
| Bit No. "2" | 1 | 1 | 1 |

This is the converse situation of Example No. 3 and is corrected by a control signal on line 98 which causes the voltage levels of the reference signals on lines 91, 92, and 93 to all be raised by the same amount.

EXAMPLE NO. 5

| Comparator | 87 | 88 | 89 |
|---|---|---|---|
| Bit No. "1" | 0 | 0 | 0 |
| Bit No. "2" | 0 | 0 | 1 |

Merely because the level of the reference signal on line 93 is higher than the voltage level of the bit stream at bit time "1" and lower than the voltage level of the bit stream at bit time "2" does not indicate an error in either gain or offset to the logic circuit 101, and no corrective control signal is provided on line 98.

EXAMPLE NO. 6

| Comparator | 87 | 88 | 89 |
|---|---|---|---|
| Bit Time "1" | 1 | 1 | 1 |
| Bit Time "2" | 0 | 1 | 1 |
| Bit Time "3" | 1 | 1 | 1 |
| Bit Time "4" | 0 | 1 | 1 |

This is an ambiquous combination of comparator output signals. It could be an indication of the true serial bit stream signal on line 84, or it could occur when the signal on line 84 is so contaminated with noise that it is centered about the voltage level of the reference signal on line 91 with the gain of the amplifier 90 being so great that the difference between the levels of the reference signals on lines 91 and 93 is too large to enable the true serial bit stream to be detected.

In order to resolve this situation, the logic circuit 101 provides a control signal on lines 98 to the amplifier circuit 90 to cause the amplifier circuit 90 to go into a search mode if there is no transition in the output of the comparator 88 for 256 consecutive bit times. When the amplifier circuit 90 goes into the search mode, the amplifier gain is reduced to a predetermined minimum and the offset level is adjusted until the output of comparator 89 is changed to "0." The amplifier circuit then is returned to a mode wherein it responds to the logic circuit as described with reference to Examples 1 through 5.

When the comparator outputs are complementary in sense from those given in Example No. 6, with only the output of comparator 89 changing between "0" and "1" and the outputs of both comparators 87 and 88 remaining at "0, " and no transition occurs at the output of the comparator 88 for 256 consecutive bit times, the amplifier circuit then also is caused to go into the search mode and adjusts the amplifier circuit gain to a minimum. However, the offset level is adjusted until the output of comparator 87 is changed to a "1."

Referring again to FIG. 4, a selector switch 103 selects the reconstructed serial bit stream from either comparator 88 output line 95 of the A/D converter 85 or from line 104 which provides a detected data signal from the bit sync module 42. The detected data signal on line 104 is selected when the input buffer module is clocked by an internal clock signal on line 81; and the signal on line 95 is selected when the input buffer module is clocked by an external clock signal on line 81.

A code converter 106 accepts the reconstructed serial bit stream on line 107 from the selector switch 103. The serial bit stream is provided by the code converter 106 on line 45. The code converter 106 also provides a BI0-L data signal on line 28 and a NRZ-L data signal on line 29. A bit clock signal is provided by the code converter 106 on line 49 in sync with the reconstructed serial bit stream on line 45. The code converter 106 is clocked by the clock signal on line 81. The code converter 106 controls the polarity of the serial bit stream on line 45 in accordance with a programming indication provided on line 108 from the microprocessor module 51 via the buss 67 and the program control latch circuit 78.

Figure 5:
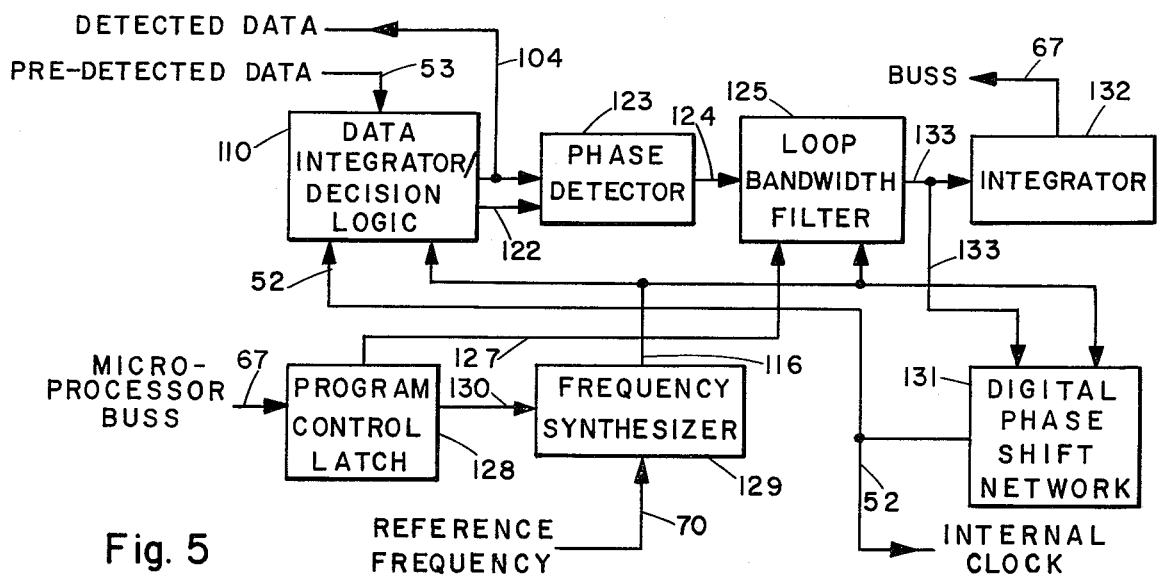
FIG. 5 is a block diagram of the bit sync module included in the system of FIG. 3.
Figure 25:
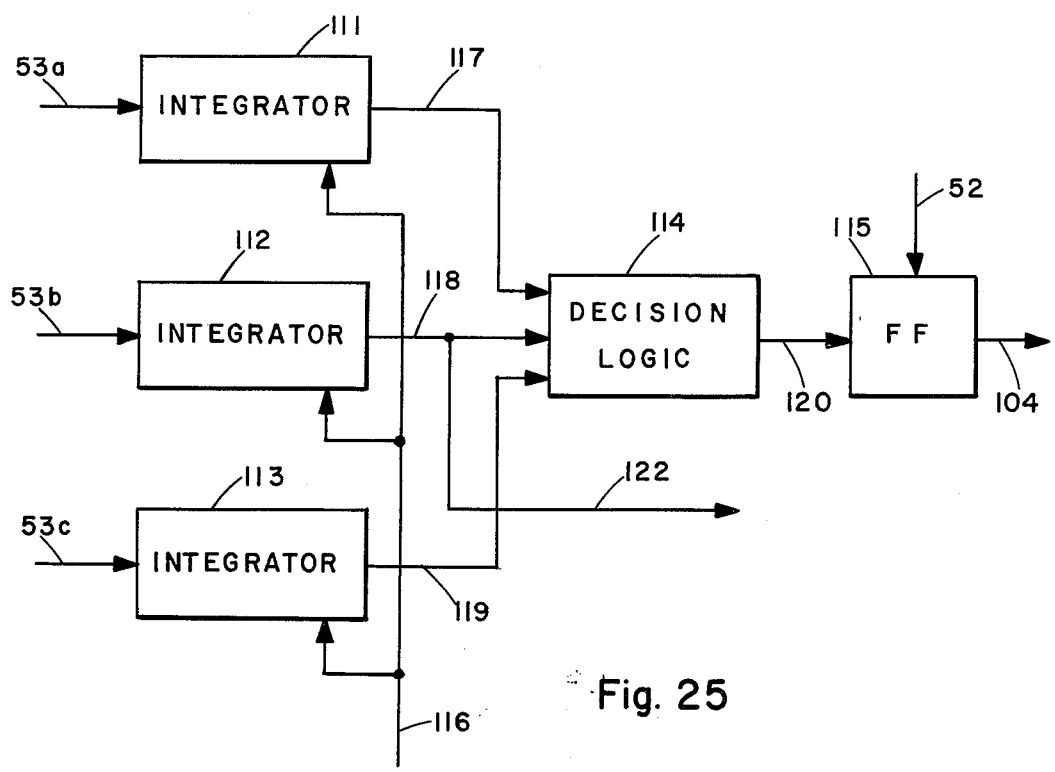
FIG. 25 is a block diagram of the data integrator/decision logic circuit included in the bit sync module of FIG. 5.

Referring to FIG. 5, the bit sync module 42 provides the detected data signal on line 104 from a data integrator/decision logic circuit 110. The data integrator and decision logic circuit 110 is shown in greater detail in FIG. 25 as including three integrators 111, 112, and 113, a decision logic circuit 114, and a flip-flop 115. The integrators 111, 112, and 113 receive the noise contaminated output signals from the comparators 87, 88, and 89 on lines 53a, 53b, and 53c respectively. Each of the integrators 111, 112, 113 continuously integrates the signal received on its respective input line 53a, 53b, 53c over an interval equal to the predetermined bit period. The output of the integrators 111, 112, 113 is updated continuously in response to a clock signal provided on line 116 at 16 times the predetermined bit rate. The outputs of the three integrators 111, 112, 113 are provided on lines 117, 118, and 119 respectively to the decision logic circuit 114 wherein they are examined on a weighted basis. The decision logic circuit 114 provides a signal on line 120 having an output state corresponding to the output state of the majority sign of the integrator output signals on lines 117, 118, and 119. The signal on line 120 continuously changes as the continuous integration by the integrators 111, 112, and 113 progresses. The signal on line 120 is sampled by the flip-flop 115 at the predetermined bit rate in response to the internal clock signal provided on line 52 to thereby provide the noise free detected data signal on line 104 from the flip-flop 115.

The detected data signal on line 104 will be more accurate in relation to the original serial bit stream if the sample is taken by the flip-flop 115 when only a single bit is being integrated and not during a transition between successive bits, which may be of differing signs. It is assumed that the internal clock signal which clocks the sampling of the signal on line 120 by the flip-flop 115, is in phase and freqency lock with the reconstructed serial bit stream provided by the detected data signal on line 104.

To assure such a phase and frequency lock, the output signal of the integrator 112 is provided on line 122 to a phase detector circuit 123. The detected data signal on line 104 is also provided to the phase detector circuit 123. The phase detector 123 provides a signal on line 124 that is indicative of the phase error between the internal clock signal on line 52 and the reconstructed serial bit stream on line 104. Phase error is determined by the phase detector 123 by examining the sign of the signal on line 122 from the integrator 110 at each time a bit transition between a "1" and a "0," or between a "0" and a "1," occurs in the reconstructed serial bit stream on line 104. The output of the phase detector 123 corresponds to the sign of the signal on line 122 upon each such bit transition. A positive sign indicates that the internal clock signal on line 52 lags the serial bit stream on line 104.

The detected phase signal on line 124 is provided to a loop bandwidth filter 125. The loop bandwidth filter 125 limits the rate at which the bit rate of the internal clock signal on line 52 can be changed in response to the phase error signal on line 124. The loop bandwidth filter 125 is a programmable digital filter which integrates the phase error signal on line 124 over a programmed period of from 1 to 256 bits. The loop bandwidth filter 125 is programmed by a programming indication provided on line 127 from the microprocessor module 51 via buss 67 and program control latch 128. The integration performed by the loop bandwidth filter 125 is clocked by the clock signal on line 116 at 16 times the predetermined bit rate. The clock signal at 16 times the predetermined bit rate is provided on line 116 by a frequency synthesizer 129. The frequency synthesizer 129 derives the clock signal on line 116 from the 11.404 MHz reference frequency signal on line 70 in accordance with a programming indication received on line 130 from the microprocessor module 51 via the program control latch circuit 128 and buss 67.

The loop bandwidth filter 125 provides the limited phase error signal on line 133 to a digital phase shift network 131. The digital phase shift network 131 provides the internal clock signal on line 52 in response to the clock signal on line 116 from the frequency synthesizer 129, and shifts the phase of the internal clock signal on line 52 in accordance with the limited phase error signal on line 133 so as to lock the phase of the internal clock signal on line 52 to that of the reconstructed serial bit stream on line 104.

The limited phase error signal on line 133 also indicates the frequency error between the reconstructed serial bit stream on line 104 and the clock signal on line 116 from the frequency synthesizer 129.

The internal clock signal on line 52 is locked in frequency with the reconstructed serial bit stream on line 104 by means of a feedback loop, which includes the digital phase shift network 131, an integrator 132, buss 67, the microprocessor module 51, buss 67, the program control latch 128, line 130, the frequency synthesizer 129, line 116, and the loop bandwidth filter 125. The limited phase error signal on line 133 is integrated by the integrator 132 over 8196 bit periods. From the output of the integrator 132 the frequency of the bit rate of the serial bit stream on line 104 is computed by the microprocessor module 51. The microprocessor module 51 then provides a signal on line 130 to the frequency synthesizer 129 to adjust the clock signal on line 116 to be 16 times the bit rate of the reconstructed serial bit stream on line 104.

Figure 6:
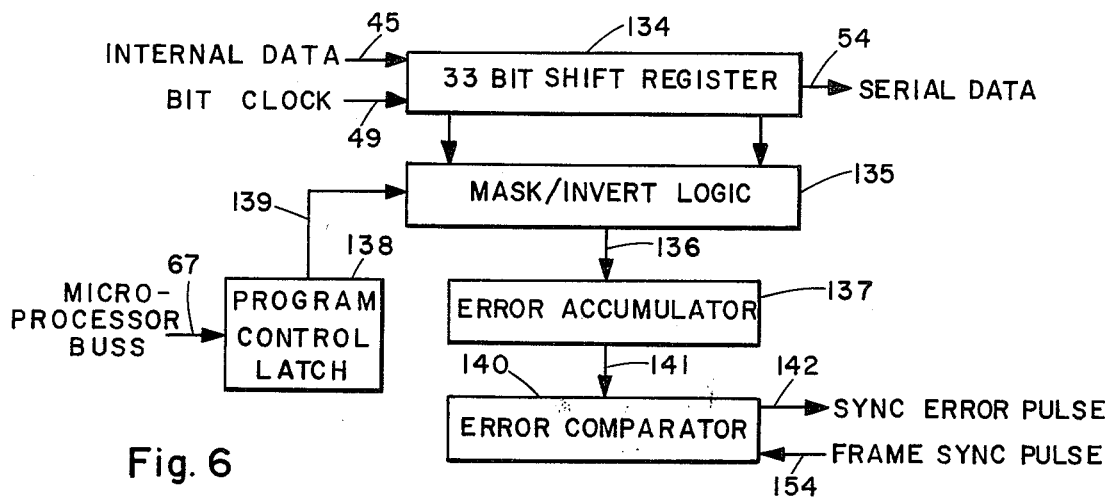
FIG. 6 is a block diagram of the sync detector module included in the system of FIG. 3.

Referring to the sync detector module shown in FIG. 6, the reconstructed bit stream is received as an internal data signal on line 45 by a thirty-three bit shift register 134. The reconstructed serial bit stream is clocked through the shift register 134 by the bit clock signal on line 49.

The predetermined synchronizing code word is stored in the mask/invert matrix 135 from the microprocessor module 51 via buss 67, a program control latch circuit 138 and lines 139. The predetermined synchronizing code word is 33 bits long.

A bit by bit comparison is made between the predetermined synchronizing code word in the matrix 135 and the 33 bits passing through the shift register 134 at any given bit time. Thirty three lines 136 corresponding to the respective 33 bit positions provide an indication to an error accumulator circuit 137 of the number of bit positions where there is a disagreement between the sign of the bit in the shift register 134 and the sign of the bit in the corresponding bit position in the logic matrix 135. The number of such disagreements is defined as the magnitude of the error.

An error comparator circuit 140 receives a count of the errors on lines 141 from the error accumulator 137 during each bit period. The error count received on the line 141 is stored in the error comparator circuit 140. Each newly received error count on line 141 is compared with the stored error count, and the lowest error count is retained in storage by the error comparator 140.

Figure 7:
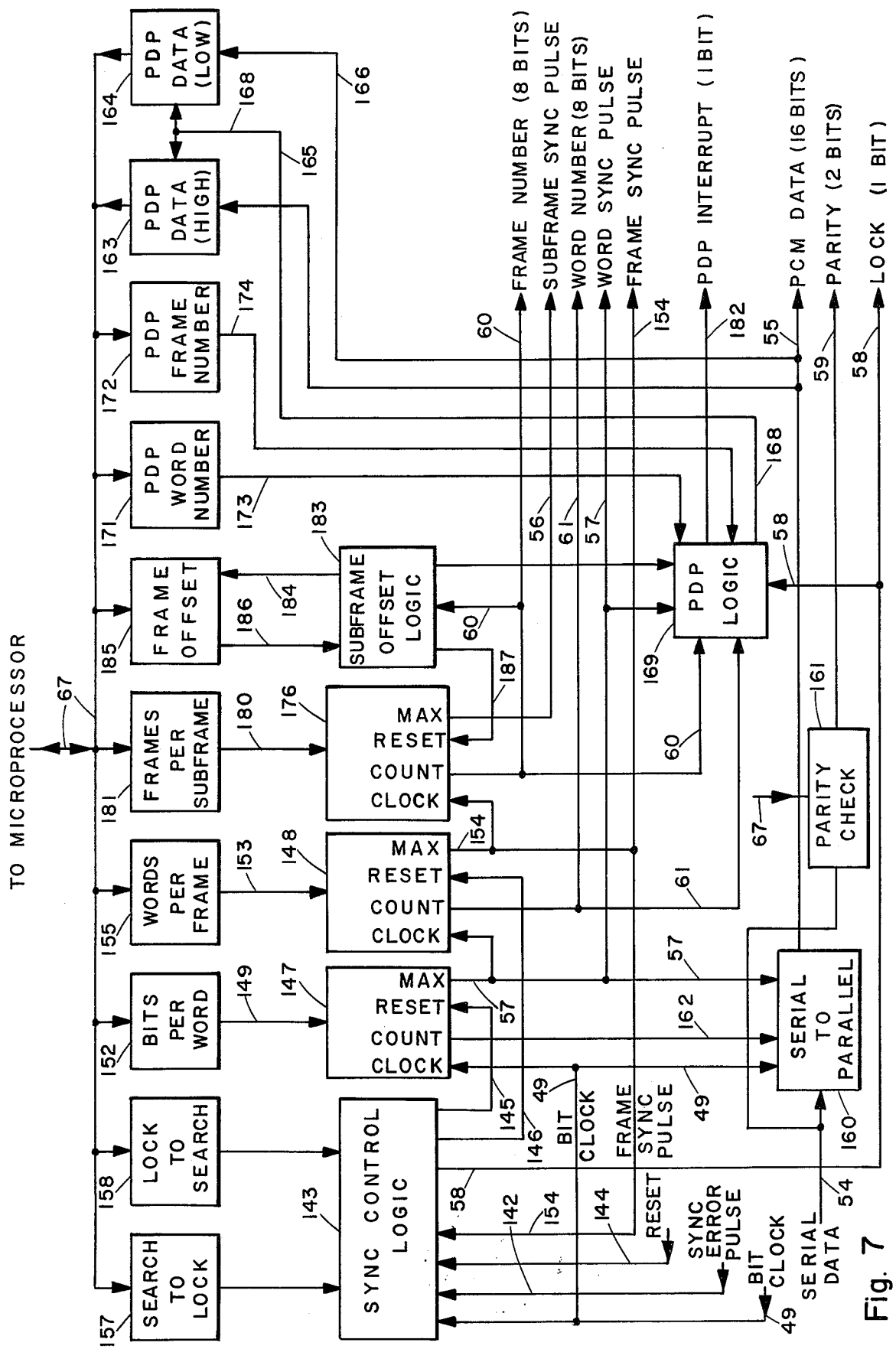
FIG. 7 is a block diagram of the frame and subframe synchronizer included in the system of FIG. 3.

The sync detector module 46 (FIG. 6) is based upon a "best-fit" synchronization strategy, wherein it is assumed that the synchronizing code word in the reconstructed serial bit stream is the word with respect to which the fewest number of errors, or disagreements, are indicated on lines 136 to the error accumulator 137. Thus, in accordance with this "best-fit" strategy, each new bit position is continuously examined as explained above to ascertain at which combination of thirty-three consecutive bit positions there is the fewest number of errors. Accordingly, each time the comparison by the error comparator 140 results in a lower error count being stored in the error comparator 140, it is assumed that the corresponding 33 bit positions hold the synchronizing code word of which detection is sought. Thus, each time a lower error count is detected and stored by the error comparator 140, a sync error pulse is delivered on line 142 to the sync control logic circuit 143 in the frame and subframe synchronizer 50 (FIG. 7).

Initially the sync control logic circuit 143 operates in a search mode, and provides signals on lines 145 and 146 to reset a bit counter 147 and a word counter 148 respectively each time a sync error pulse is received on line 142.

The bit counter 147 counts the bits in the bit clock signal received at its clock input via line 49. The bit counter 147 is preset by a signal on line 149 to deliver a word sync pulse on line 57 to the clock input of the word counter 148 upon counting the predetermined number of bits per word. The predetermined number of bits per word is stored in the bits per word latch circuit 152, by the microprocessor module 51 via buss 67, and is provided on line 149 to present the bit counter 147.

The word counter 148 counts the word sync pulses received at its clock input via line 57 from the bit counter 147. The word counter 148 is preset by a signal on line 153 to deliver a frame sync pulse on line 154 upon counting the predetermined number of words per frame. The predetermined number of words per frame is stored in the words per frame latch circuit 155 by the microprocessor module 51 via buss 67 and is provided on line 153 to preset the word counter 148.

The frame sync pulse on line 154 is provided to the sync control logic circuit 143 and also to the error comparator circuit 140 in the sync detector module 46 (FIG. 6). The sync control logic circuit 143 looks for the sync error pulse on line 142 to appear in a one bit duration window at the beginning of each frame as defined by the frame sync pulse on line 154. The one bit duration window is defined by the bit clock signal received by the sync control logic circuit via line 49. The frame sync pulse provided on line 154 to the error comparator circuit 140 clears the counter in the error comparator circuit to zero. Thus, if the sync error pulse provided on line 142 correctly identified the location of the predetermined synchronizing code word in the reconstructed serial bit stream received from line 45, the sync error pulse on line 142 will occur during the one bit window at the beginning of the frame defined by the frame sync pulse on line 154, and control logic circuit 143 will repeatedly recognize the sync error pulse on line 142 within such window.

Upon the sync error pulse being recognized within the window during a predetermined number of consecutive frames (as preset by the number stored in the "search to lock" latch circuit 157), the sync control logic circuit 143 begins operating in a "lock" mode; wherein the bit counter 147 and word counter 148 are reset only at the beginning of each frame as defined by the frame sync pulse on line 154, notwithstanding that a sync error pulse might arrive on line 142 at some time other than during the one bit duration window occurring at the beginning of each frame. This predetermined number is stored in the "search to lock" latch circuit 157 by the microprocessor module 51 via buss 67.

However, should the sync logic control circuit 143 fail to recognize the occurrence of a sync error pulse on line 142 during the one bit wondow at the beginning of the frame for a predetermined number of consecutive frames (as preset by the number stored in the "lock to search" latch circuit 158), the sync control logic circuit 143 again begins operating in the search mode. This predetermined number is stored in the "lock to search" latch circuit 158 by the microprocessor 51 via buss 67.

The frame and subframe synchronizer 50 (FIG. 7) includes a serial to parallel converter 160, which converts the reconstructed serial bit stream on line 54 into a parallel PCM digital data signal on line 55. The serial to parallel converter 160 converts the serial bit stream on line 54 in response to the bit clock signal on line 49, the bit count provided on line 162 from the bit counter 147, and the word sync pulse on line 57.

A parity check circuit 161 is programmed with a predetermined parity bit by the microprocessor module 51 via buss 67 and compares the predetermined parity bit with a parity bit in the reconstructed serial bit stream on line 54 at a predetermined bit location. In response to such comparison, a two bit parity signal is provided on line 59. One bit identifies the ideal state of the bit in the parity check location in the serial bit stream and the other bit location is for indicating a parity error flag.

The synchronizer 50 includes a programmable data port (PDP) made up of the PDP data modules 163 and 164 for providing a sixteen bit data word from the parallel PCM data on line 55 via lines 165 and 166 respectively. PDP data module 163 provides the eight "high" or most significant bits of the data word and PDP data module 164 provides the eight "low" or least significant bits of the data word. This data word is provided to the microprocessor module 51 via buss 67 to provide data for display by the CRT 14 and to provide data for enabling the microprocessor module 51 to establish subframe synchronization.

The data is latched into the PDP data modules 163 and 164 from line 55 only upon the provision of a latching signal on line 168 from the PDP logic circuit 169 to the PDP data modules 163, 164. The latching signal on line 168 indicates that the parallel PCM data signal on line 55 is then providing data for the programmed data location in the parallel PCM data signal. The programmed data location is stored in the PDP word number latch circuit 171 and the PDP frame number latch circuit 172 by the microprocessor module 51 via buss 68. The PDP logic circuit 169 receives the programmed word and frame numbers of lines 173 and 174 from latch circuits 171 and 172 respectively and compares such programmed numbers with the respective word and frame counts corresponding to the location in the reconstructed serial bit stream of the programmed data location, provided by the word counter 148 and the frame counter 176 on lines 61 and 60 respectively. The latching signal is provided on line 168 only when the counts on line 61 and 60 match the corresponding programmed numbers on lines 173 and 174 respectively. The PDP logic circuit 169 is operable only when the sync control logic 143 is in the "lock" mode of operation, as is indicated by a one bit lock signal on line 58 from the sync control logic circuit 143. When the foregoing conditions are met the latching signal is provided on line 168 upon the occurrence of the word sync pulse on line 57.

When the PDP logic circuit 169 provides the latching signal on line 168 to the PDP data modules 163 and 164, a PDP interrupt signal is provided on line 182 of the microprocessor module 51 via the interface module 69. The frame counter 176 also is a presettable counter. In the preferred embodiment it is preset to count a predetermined number of frames per subframe in accordance with a predetermined number provided on line 180 from a frames per subframe latch circuit 181. The predetermined number of frames per subframe is stored in the latch circuit 181 by the microprocessor module 51 via buss 67. The frame counter 176 provides a subframe sync pulse on line 56 upon counting the predetermined number of frames per subframe. The subframe sync pulse on line 56 defines the beginning of a subframe.

There must be correct subframe synchronization. This means that frame locations in the distinguished digital data signal must occur in a predetermined order upon the beginning of each subframe. That is to say that a predetermined frame identified by frame identification number "1" must be the first frame in each subframe. Such a condition is ascertained by a subframe logic offset circuit 183 which operates in conjunction with the microprocessor module 51.

The counted frame number is provided to the logic offset circuit 183 on line 60 from the frame counter 176. The counted frame number is then provided on line 184 to a frame offset circuit 185, which is embodied in data processing routine within the microprocessor module 51. The frame offset circuit 185 ascertains the acutal frame identification of the frame then being provided in the reconstructed serial bit stream by programming the PDP word number latch circuit 171 and the PDP frame number latch circuit 172 to provide the actual frame identification number at the PDP port modules 163 and 164. The frame offset circuit 185 compares the actual frame identification number with the counted frame number provided on line 60 and determines how much they are offset from each other. The frame offset circuit 185 provides an indication of the amount of any such offset on line 186 to the subframe offset logic circuit 183; and the offset logic circuit 183 responds by providing an offset correction signal on line 187 to the reset input of the frame counter 176 to change the count in the frame counter 176 by the amount of such offset. The offset correction signal is provided on line 187 at the beginning of the subframe when the actual frame count should be zero.

Once the frame counter 176 is synchronized with the subframe, data for display can be correctly accessed.

Figure 8:
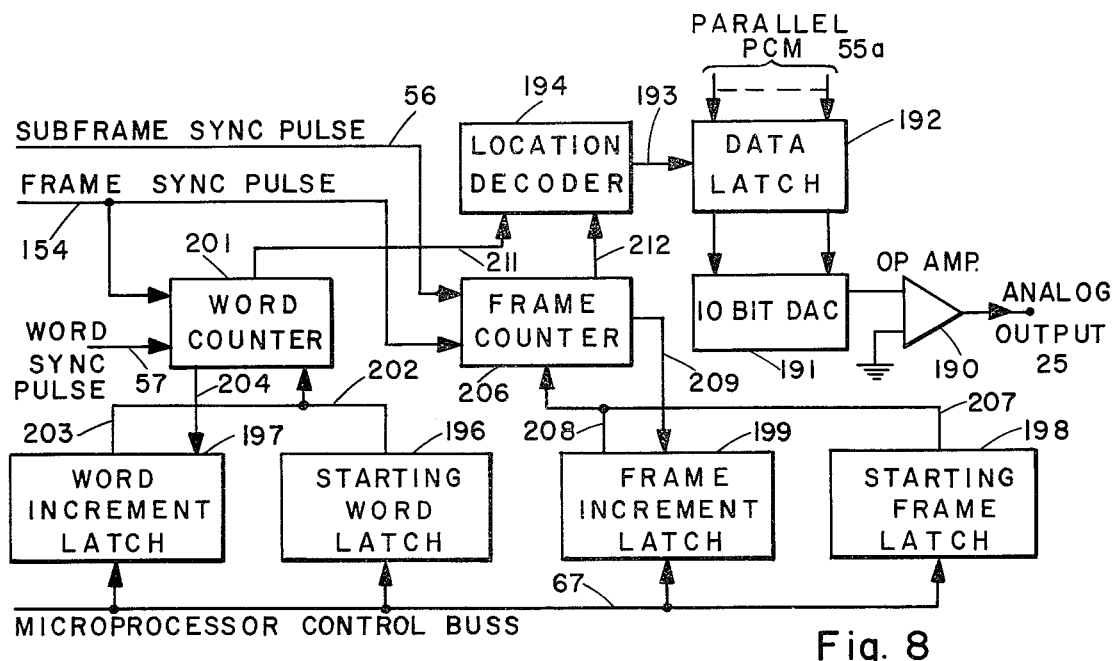
FIG. 8 is a block diagram of a single analog signal circuit contained in an analog port module included in the system of FIG. 3.

The construction of each analog signal circuit contained in an analog data port module 63, 64, 65 is shown in FIG. 8. An analog signal is provided to an analog output 25 from an operational amplifier 190 which is connected to the output of a 10 bit digital to analog converter (DAC) 191. The DAC 191 provides an analog signal by converting the parallel PCM digital data signal contained in the data latch circuit 192. The parallel PCM digital data signal is latched into the data latch circuit 192 via lines 55*a* from the serial to parallel converter 160 in the frame and subframe synchronizer 50 only when a latching signal is provided on line 193 from a location decoder circuit 194.

A latching signal having a one word length duration is provided on line 193 whenever the parallel PCM digital data signal contains data from a signal location from which an analog output signal is desired at analog output 25.

Designated signal locations from which an analog output signal is to be provided are indicated by programming indications stored in the starting word latch circuit 196, the word increment latch circuit 197, the starting frame latch circuit 198 and the frame increment circuit 199 by the microprocessor module 51 via buss 67. The starting word programming indication is loaded into a word counter 201 via line 202 in response to the frame sync pulse signal on line 154; and the word increment programming indication is loaded into the word counter 201 via line 203 when the count in the word counter 201 goes to zero as indicated by a signal on line 204 from the word counter 201, except when such count goes to zero coincident with the occurence of a frame sync pulse on line 154. A count can be loaded into the word counter 201 from only one of the two latch circuits 196 or 197 at any one time. The signal on line 204 indicates which latch circuit 196 or 197 the count is to be loaded from.

The starting frame programming indication is loaded into the frame counter 206 via line 207 in response to the subframe sync pulse on line 56; and the frame increment programming indication is loaded into the frame counter 206 via line 208 when the count in the frame counter 206 goes to zero as indicated by the signal on line 209 from the frame counter 206, except when such count goes to zero coincident with the occurence of a subframe sync pulse on line 56. A count can be loaded into the frame counter 206 from only one of the two latch circuits 198 or 199 at any one time. The signal on line 209 indicates which latch circuit 198 or 199 the count is to be loaded from.

The word counter counts down in response to the word sync pulses on line 57 from the count loaded therein from the latches 196 and 197. When the word counter 201 reaches a count of zero an enabling signal is provided on line 211 to the location decoder circuit 194.

The frame counter counts down in response to the frame sync pulses on line 154 from the count loaded therein from the latches 198 and 199. When the frame counter 206 reaches a count of zero an enabling signal is provided on line 212 to the location decoder circuit 194.

Upon enabling signals being delivered on both lines 211 and 212 simultaneously, the location decoder circuit 194 is enabled to provide the latching signal on line 193 to the data latch circuit 192.

The CRT interface module 68 (FIG. 9) contains all of the hardware that is necessary to accept character indication signals from the microprocessor module 51 and display the characters on the CRT 14. Character indication signals are received on buss 67 from the microprocessor module 51 and stored in a 1K × 8 CRT storage RAM 215. A character generator 216 receives the character indications on line 217 from the RAM 215. The character generator 216 provides signals on line 218 to a dot multiplexer 219 to provide the CRT video content signal on line 220 to the CRT monitor 72. Video sync pulses are produced on line 221 from a video sync generator 222. Twenty lines of character are generated for each CRT display page, with there being 48 character positions in each line.

The dot multiplexer 219, the video sync generator 222, the character generator 216 and a CRT scan generator 230 are clocked by signals on lines 223, 224, 225, and 226 respectively from a "divide by 9" clock circuit 227, which produces clock signals in response to the 11.404 MHz clock signal received on line 70 from the microprocessor module 51. The CRT scan generator 230 provides a signal on line 231 to the video sync generator 222 when all 48 character positions in a line are completed for indicating that it is time to retrace the video signal.

An address multiplexer 233 controls the access of the microprocessor module 51 to the RAM 215, so as to enable the microprocessor module 51 to provide character indication signals on buss 67 to selected locations in the RAM 215 during the horizontal and vertical retrace intervals. A "ready" signal is sent on line 235 to the microprocessor module 51 during the retrace interval in order to call up character indications from the microprocessor module 51 for storage in the RAM 215.

While the video signal is being generated the address multiplexer 233 addresses the storage locations in the RAM 215 is sequentially in response to an incremental signal provided on line 234 from the CRT scan generator 230.

Figure 10:
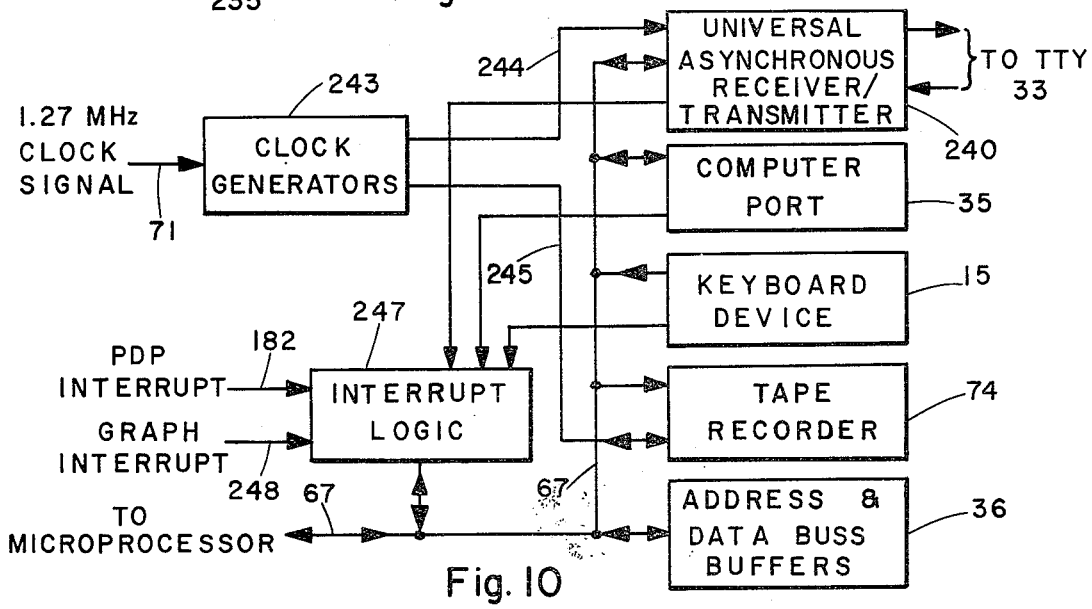
FIG. 10 is a block diagram of the CRT interface module included in the system of FIG. 3.

The interface module 69 (FIG. 10) provides an interface between the microprocessor module 51 and the keyboard device 15, the tape recorder 74 and terminals 33, 35, 36, (on the back panel 12) to which certain peripheral devices may be connected. A universal asynchronous receiver/transmitter (UART) 240 is connected between the microprocessor busses 67 and the teletype terminals 33. A computer port 35 is connected to microprocessor busses 67. The microprocessor busses 67 also extend to peripheral buss extension terminal 36. The keyboard device 15 and the tape recorder 74 are also connected to the microprocessor data busses 67.

Clock generators 243 provide clock signals to the UART 240 on line 244 and to the tape recorder 74 on line 245. The clock signals provides on lines 244 and 245 are derived from a 1.27 MHz clock signal provided to the clock generators 243 on line 71 from the microprocessor module 51.

An interrupt logic circuit 247 provides an interrupt signal to the microprocessor module 51 via buss 67 in order to establish priority within the microprocessor module 51 for the functions related to the particular device from which the interrupt signal is initiated. The interrupt logic circuit 247 provides an interrupt signal whenever a key is depressed in the keyboard device 15, in response to a "PDP" interrupt signal on line 182, in response to a "graph" interrupt signal on line 248 (from the graph module, FIG. 13), when a signal is received from a teletype device by the UART 240, or when data is stored in the microprocessor module from the tape recorder 74.

Figure 11:
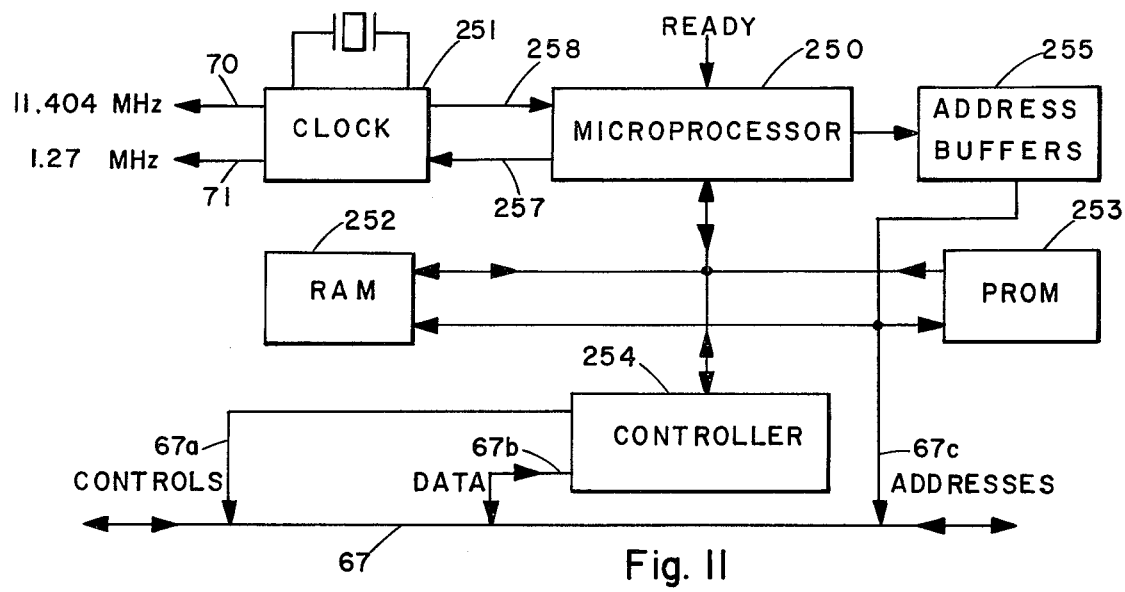
FIG. 11 is a block diagram of the microprocessor module included in the system of FIG. 3.

The microprocessor module 51, (FIG. 11) includes a microprocessor 250, a crystal controlled oscillator clock circuit 251, a random access memory (RAM) 252, a programmable read only memory (PROM) 253, a controller 254, and address buffers 255. The microprocessor 250 controls the display transfer, and storage of the programming indications and of data from the distinguished digital data signal as described hereinabove. The microprocessor 250 also assembles data from the distinguished digital data signal for display on the CRT 14; and performs the computation, comparison and control functions described hereinabove. The routines executed by the microprocessor 250 are stored in the PROM 253. The programming indications are stored in the RAM 252. The term programming indications includes all indications provided upon operation of the keyboard device 15.

Data signals are provided to and from the microprocessor 250 by the controller 254. Control signals are provided from the microprocessor 250 by the controller 254. Addresses are provided from the microprocessor 250 by the address buffers 255. The control buss 67a from the controller 254, the data buss 67b to and from the controller 254, and the address buss 67c from the address buffer are indicated throughout this Specification as being combined in a single of busses 67 in order to simplify the Drawing, although all three such busses are not actually present at all system locations where the busses 67 are shown in the drawing or indicated in the text.

The clock 251 provides a 11.404 MHz clock signal on line 70 and a 1.27 MHz clock signal on line 71 in response to control signals from the microprocessor 250 on line 257. The clock 251 also provides clocking signals on line 258 for the operation of the microprocessor 250.

The simulator module 44 (FIG. 12) provides a simulated serial bit stream on line 43 in accordance to the programming indications provided by operation of the keyboard device 15. The simulated serial bit stream on line 43 is generated in response to the internal clock signal received on line 52. The simulated serial bit stream on line 43 includes a frame sync code word, a subframe sync code word, a subframe identification word, special words in specific word locations, and common words in the remaining word locations.

The predetermined numbers of bits per word is stored in "bits/word" latch 260. The predetermined number of words per frame is stored in the "words/frame" latch 261. The predetermined number of frames per subframe is stored in the "frame/subframe" latch 262. Programming indications related to the generation of the subframe ID number are stored in the "SFID control bits" latch 263. These programming indications are provided to a "subframe ID counter and alignment logic" circuit 264. The programming indications stored in the "SFID control bits" latch 263 indicate an initial count to the counter of circuit 264 and also indicate the displacement within the subframe ID word of the ID count.

The frame sync code word, the subframe sync code word, the special word and the common word are all stored in a word RAM 265. The locations in the serial bit stream where the frame sync code word, the subframe sync code word, the special word, the common word, and the subframe ID word are to appear, are stored in a frame RAM 266 and a subframe RAM 267. A conversion code is stored in the code converter 268.

A bit counter 269 counts bits in the internal clock signal on line 52 and provides a signal indicating the bit location within a word on line 270 to the word RAM 265. The bit counter 269 also provides a word sync pulse on line 271 in accordance with the predetermined number of bits per word stored in latch 260, and is reset upon counting said predetermined number.

The word counter 272 counts the word sync pulses on line 271 and provides a signal indicating the word location within a frame on line 273 to the frame RAM 266. The word counter 272 also provides a frame sync pulse on line 274 in accordance with the predetermined number of words per frame stored in latch 261, and is reset upon counting said number.

The frame counter 275 counts the frame sync pulses on line 274 and provides a signal indicating the frame location within a subframe on line 276 to the subframe RAM 267 and to the subframe ID counter and alignment logic circuit 264. The frame counter 275 is reset in accordance with the predetermined number of frames per subframe stored in the latch 262.

The frame RAM 266 and the subframe RAM 267 respond to the word and frame locations signals on lines 273 and 276 respectively to provide signals on lines 277 and 278 respectively for accessing the word from the word RAM 265 that is to appear at the location indicated by the combination of word location and frame location signals on lines 273 and 276. The signals on lines 277 and 278 are provided to the RAM 265 via a "2 to 1 multiplexer" 279, which is controlled by a control logic circuit 280.

The accessed word is provided from the word RAM 265 on line 281 to an OR gate 282, from where it is provided on line 283 to the code converter 268.

The "subframe ID counter and alignment logic" circuit 264 responds to the frame location indication signal on line 276 and a control signal on line 285 to provide the subframe ID number on line 284 to the OR gate 282 in accordance with the programming indications stored in the latch 263. The control signal is provided on line 285 from the control logic circuit 280 in response to an indication from the frame RAM 266 when the word location of the subframe ID number is indicated on line 273 from the word counter 272.

The code converter 268 converts the signals on line 283 in accordance with the predetermined code stored in the code converter 268 to provide the simulated serial bit stream on line 43.

Figure 9:
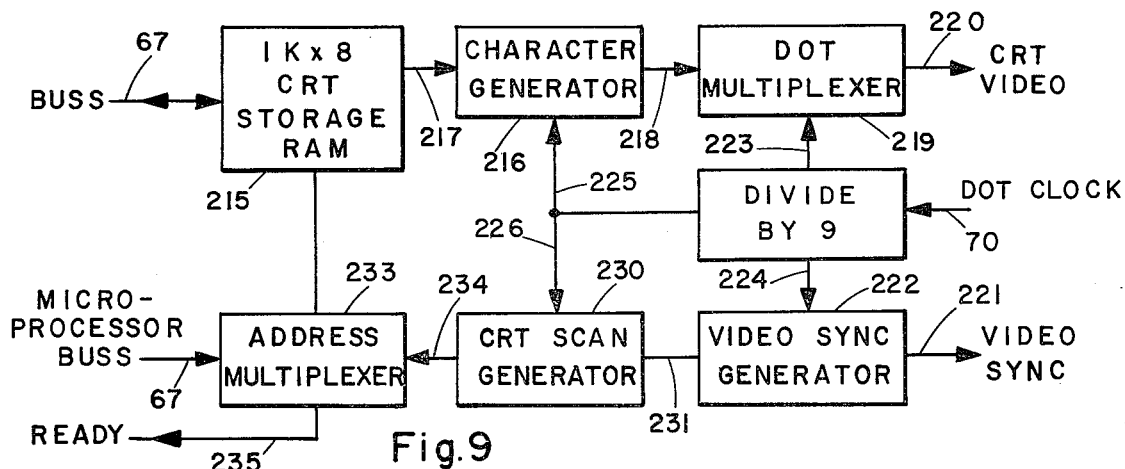
FIG. 9 is a block diagram of the interface module included in the system of FIG. 3.
Figure 13:
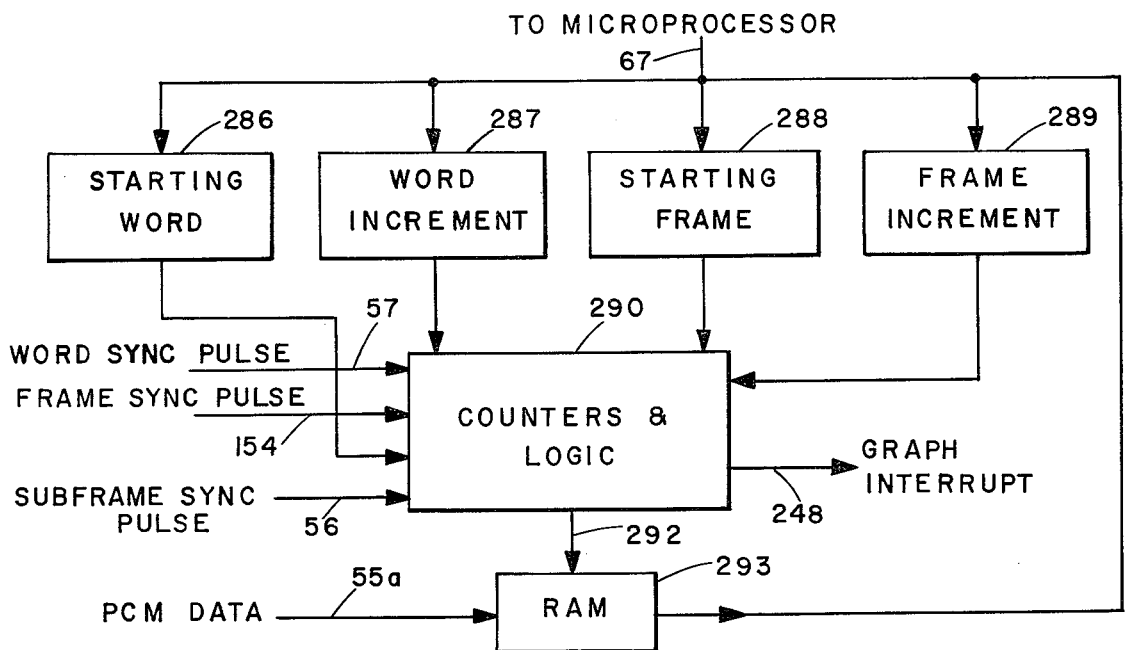
FIG. 13 is a block diagram of a graph display module that may be used with the system of FIG. 3.

A graph display module, as shown in FIG. 13, is included in the system for providing a display on the CRT 14 of a graphical representation of data from selected word locations in the distinguished digital data signals. The selected word locations from which the graphical representations are to be displayed are indicated by programming indications stored in a "starting word" latch 286, a "word increment" latch 287, a "starting frame" latch 288, and a "frame increment" latch 289, the same as with the analog data signal circuit shown in FIG. 8. The indications stored in the latches 286, 287, 288, and 289 are provided to a "counters and logic" circuit 290, which functions in the same manner as the combination of word counter 201, frame counts 206 and location decoder 194 in the analog data signal circuit of FIG. 8. Accordingly, the "counters and logic" circuit 290 responds to the combination of word sync pulses on line 57, frame sync pulses on line 154 and subframe sync pulses on line 56 to provide a signal on line 292 to the RAM 293 for indicating which data from the parallel PCM data signal received on line 55a are to be stored in the RAM 293. Thirty-two data words are stored in the RAM 293. The RAM is accessed by the microprocessor module 51 via buss 67 to provide the stored data words to the microprocessor module 51 for generating a graphical representative of the data on the CRT 14 via the CRT interface module 68 (FIG. 9). A graph interrupt signal is provided on line 248 to the interface module 69 (FIG. 10) when all thirty two data words are stored in the RAM 293 to thereby initiate the accessing of the data words from the RAM 293 by the microprocessor module 51. When the 32 words have been accessed from the RAM 293 by the microprocessor module 51, the RAM 293 is emptied and the RAM storage process begins anew after the next subframe sync pulse on line 56.

The use of the system of the present invention is described with reference to FIG. 14, which shows the keyboard of the keyboard device 15, and FIGS. 15 through 23, which show the nine different display pages displayed on the CRT for use in providing programming indications to the system, and for use in displaying data from the distinguished digital data signal. The display page number is shown in the upper right hand corner of each display page as seen in FIGS. 15 through 23.

A table showing the relationship between display page numbers and Figure numbers follows.

| Display Page | Figure |
| --- | --- |
| 1 | 15 |
| 2 | 16 |
| 3 | 17 |
| 4 | 18 |
| 5 | 19 |
| 6 | 20 |
| 7 | 21 |
| 8 | 22 |
| 9 | 23 |

Figure 14:
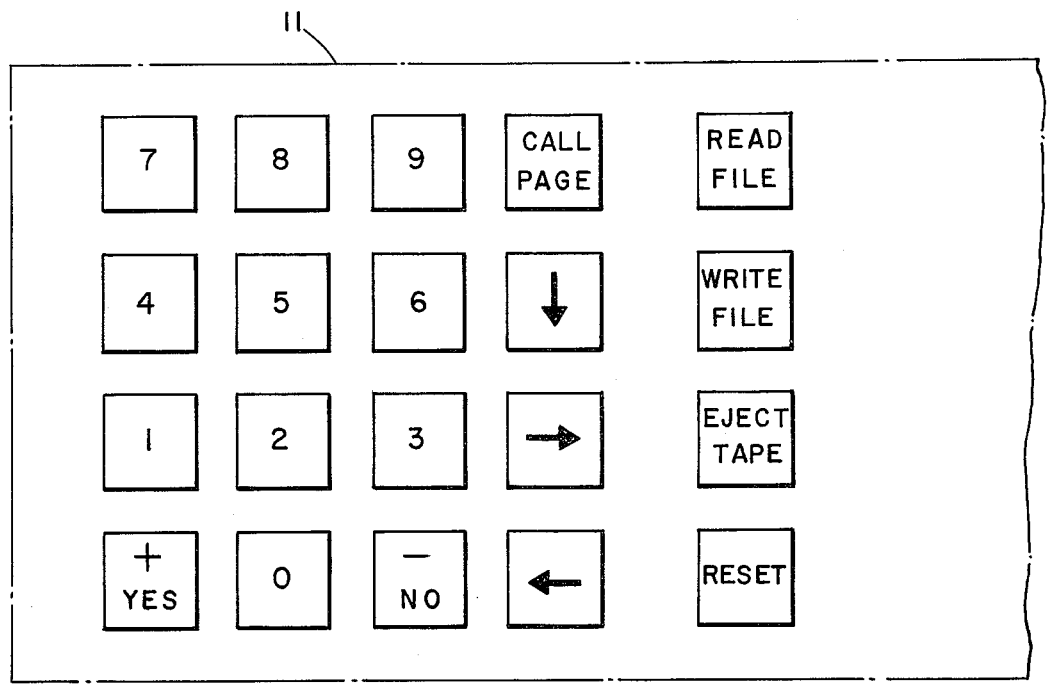
FIG. 14 is an enlarged view of the keyboard shown in FIG. 1 and included in the system of FIG. 3.
Figures 21, 22, 23:
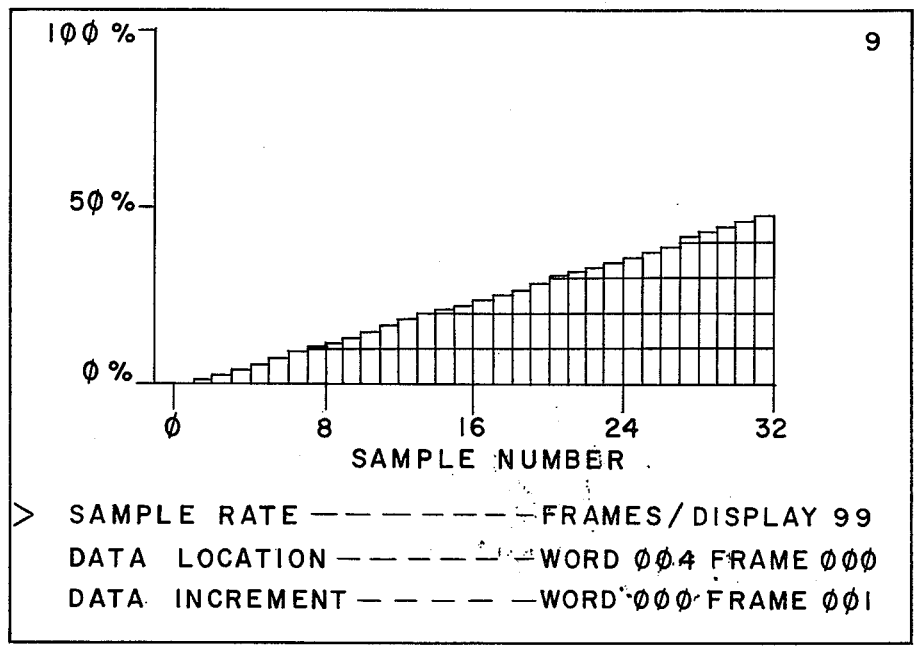
FIG. 21 shows a first CRT page display of data from selected word locations.
FIG. 22 shows a second CRT page display of data from selected word locations.
FIG. 23 shows a CRT page display of a graphical representation of data from selected word locations.

Referring to FIG. 14, the keyboard includes a matrix of twenty pushbotton keys bearing symbols as shown in the drawing. The keys control all local programming and display functions.

Depression of the CALL PAGE key followed by depression of any digit key from "1" to "9" causes the specified number display page to be displayed on the CRT 14.

Depression of the RESET key initiates the routines of the microprocessor 250; provides a reset signal on line 144 in the frame and subframe synchronizer 50 to cause the sync control logic to begin operation in the search mode; and adjusts the frequency of the frequency synthesizer 129 in the bit sync module (FIG. 5) to the "bit rate" indicated by the operator on display page 1.

Depression of the line feed key " ↓ " advances the line cursor on the display page to the next lower line of characters on the display page and enables the RAM 252 in the microprocessor module (FIG. 11) to receive any programming indications identified in that line of characters on the display page when a key is depressed. Such programming indications are stored in an appropriate latch circuit or other storage location within the system when the line cursor is returned to the top of the display page. From the bottom of the display page, the cursor is returned to the top of the display page upon the next depression of the line feed key " ↓ ." The line cursor is also returned to the top of the page each time a new display page is displayed on the CRT 14.

Depression of the character feed key "←" back spaces the space cursor one character space to the left.

Depression of the character feed key "→" advances the space cursor on character space to the right.

Depression of the "+/YES" key provides a variable programming indication which assumes various denotations as a function of the displayed page display and the cursor position. In general, depression of this key means a positive indication, such as "positive," "even," "up," etc.

Depression of the "−NO" key provides a variable programming indication which assumes various denotations as a function of the displayed page display and the cursor position. In general, depression of this key means a negative indication, such as "negative," "odd," "down," etc.

Depression of the numeric character keys "0" through "9" provides a programming variable which generally assumes the denotation of the number shown on the key. However, in some instances the denotation is a function of the displayed page display and the cursor position. For example, such programming indications as a particular "data code," may be provided by depression of a numeric character key "0" to "9."

Depression of the "EJECT TAPE" key causes the tape recoder 74 to rewind the tape in the tape data cartridge 16 to the beginning, and to eject the cartridge part way out of the slot 17 in the console 10 so that the tape data cartridge 16 can be removed easily.

The WRITE FILE and READ FILE keys relate to the operation of the tape recorder 74. The tape recorder 74 is coupled to the RAM 252 in the microprocessor module 51 for storing the programming indications that are provided to the RAM 252 by the operation of the keyboard device 15. The recording tape may be recorded to include a plurality of files for containing separate sets of programming indications corresponding to serial bit streams received from different signal sources. Each file is recorded on a fixed length of tape. File No. 1 is the first fixed length segment of the tape and File No. 2 is the second fixed length segment, etc. The operator selects the file number in which he desires to record programming indications on the tape from the RAM 252, by indicating the file number in the "Continue to File" position on display page 5. Depression of the WRITE FILE key then causes the programming indications to be recorded in the segment of the tape corresponding to the file number, indicated in the "Continue to File" position on display page 5.

Depression of the READ FILE key causes the programming indications to be stored into the RAM 252 from that segment of the tape corresponding to the file number indicated in the "Continue to File" position on display page 5.

When a file other than the next one in sequence is requested upon depression of either the WRITE FILE or READ FILE key, the tape recorder advances the tape to the file preceeding the requested file at high speed and the proceeds to the end of the preceeding file to make sure that the recording starts at the beginning of the requested file. The microprocessor 250 computes the distance between the present file position of the tape and the requested file position and causes the tape recorder to advance the tape by two thirds of this distance at high speed by operating the tape drive at a fixed speed for a duration of time corresponding to two-thirds of the distance. If after such high speed movement, the file preceeding the requested file has not been reached, the microprocessor 250 recomputes and advances the tape at high speed for two-thirds of the remaining distance until the file preceeding the requested file is reached.

The recording tape provides a non-volatile storage medium for storing programming indications, in contrast to those prior art systems wherein programming indications are provided by setting switches.

The words in the left hand column of display pages 1, 2, 3, and 4 are a permanent part of the respective page displays; whereas the programming indications in the right hand columns of these four pages are displayed upon operation of the keyboard device 15 by the operator to provide instant visual feedback to the operator of the programming indications provided to the RAM 252 upon operation of the keyboard device 15.

Display page "1" (FIG. 15) is displayed when providing programming indications relating to the operation of the input buffer module 38 (FIG. 4) and the bit sync module 42 (FIG. 5).

The "clock source" may be either "internal" or "external." This programming indication controls the clock selector 80 in the input buffer module (FIG. 4).

The "clock polarity" may be either "positive" or "negative." This programming indication controls the polarity of the clock signal provided on line 81 at the output of the clock selector 80. This programming indication is provided only when an external clock source is selected. The "data source" may be from source 1, source 2, source 3, or the simulator module 44 as provided on lines 39, 40, 41 or 43 respectively to the data selector 76 in the input buffer module. This programming indication controls the data selector 76.

The predetermined "bit rate" is specified by four digits and an exponent in bits per second (bps). The available range is from 16.00 EE 0 (16 bps) to 10.00 EE 5 (106 bps). This programming indication is provided on line 130 to the frequency synthesizer 129 in the bit sync module (FIG. 5).

The "track range" programming indication defines the allowable deviation from the bit rate. This programming indication also is provided on line 130 of the frequency synthesizer 129.

The "loop bandwidth" programming indication defines the rate at which the bit rate at the internal clock signal on line 52 can be changed in response to the phase error signal on line 124 in the bit sync module. This programming indication is provided to the loop bandwidth filter 125 on line 127. (FIG. 4)

The "bit error rate" programming indication is stored in a routine for the microprocessor 250. This programming indication specifies the maximum allowable bit error rate and thus establishes the threshold at which an alarm will be indicated by the alarm indicator light 22. The bit error rate is based on the number of errors in the received frame synchronization code word and can be expressed in units of errors per frame sync code word.

Display page "2" (FIG. 16) is displayed when providing programming indications related to the operation of the frame and subframe synchronizer 50 (FIG. 7), the input buffer module 38 (FIG. 4) and the sync detector module 46 (FIG. 6).

The "bits/words" programming indication is the predetermined number of bits per word. This indication is stored in the latch 152 in the frame and subframe synchronizer 50, and also in the latch 260 of the simulator module 44 when the simulated signal source is selected.

The "words/frame" programming indications is the predetermined number of words per frame. This is stored in the latch 155 of the frame and subframe synchronizer 50, and also in the latch 261 of the simulator module 44 when the simulated signal source is selected.

The "parity" indication is stored in the parity check circuit 161 in the synchronizer 50 (FIG. 7).

The "data code" and the "data polarity" indications are stored in the code converter 106 of the input buffer module 38, and also in the code converter 268 of the simulator module 44 when the simulated signal source is selected.

The "data alignment" indication as to whether the most significant bit or the least significant bit is provided first, is provided to the "serial to parallel" converter 160 in the frame and subframe synchronizer 50.

The "frame sync code" is the predetermined synchronized code word for defining each frame that is stored in the "mask/invert logic" circuit 135 of the sync detector module 46 (FIG. 6).

Referring to the "sync strategy" portion of display page 2, the "search to lock" indication is stored in latch 157, and the "lock to search" indication is stored in latch 158, both being in the synchronizer 50. The "sync strategy" establishes the number of consecutive times that the "best-fit" code must occur in the one bit duration window in order for the sync control logic circuit 143 to go from the search mode to the lock mode and the number of allowable errors (consecutive times the sync code does not appear in the window) before reverting back to the search mode.

Display page 3 (FIG. 17) is displayed when providing programming indications related to the operation of the frame and subframe synchronizer 50.

The "frames per subframe" indication is the predetermined number of frames per subframe that is stored in the latch 181 of the synchronizer 50.

The "sync method" indication is stored in a routine for the microprocessor 250 related to the function of the frame offset circuit 185 in the synchronizer 50. The system also may be operated with the "Unique Recycling Code" (URC) or the "Sync Code" methods of subframe synchronization.

The "bit" and "word" programming indications for defining the "sync location" are stored in the routine for the microprocessor 250 related to the function of the frame offset circuit 185, as are the "starting ID," "count direction," "sync code" and "sync strategy" indications. Except for the "sync stragety" indication, these programming indications are also stored in the simulator module 44 when the simulated signal source is selected.

Figure 12:
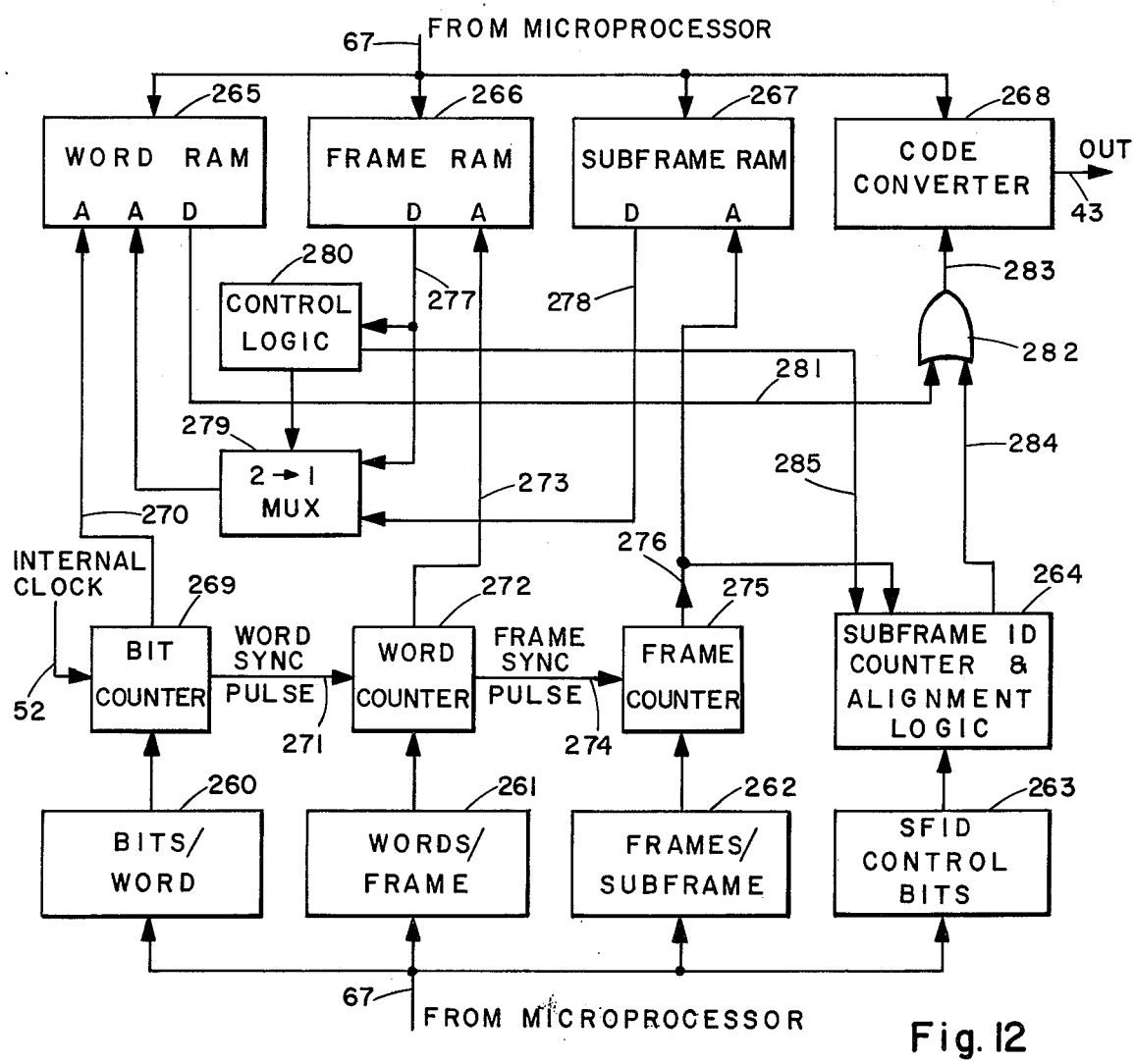
FIG. 12 is a block diagram of the simulator module included in the system of FIG. 3.

Display page 4 (FIG. 18) is displayed when providing programming indications related to the simulator module 44 (FIG. 12).

The "common word value" indication and the "special word value" indication are both stored in the word RAM 265 of the simulator module 44.

The "special word location" indications are provided to the microprocessor 250, which in turn programs the frame RAM 266 and the subframe RAM 267 for accessing the special word from the RAM 265 when the special word locations are identified by the signals on lines 277 and 278.

Display page 5 (FIG. 19) presents a display of the status of certain parameters for diagnostic purposes, and also the "continue to file" programming indication discussed hereinabove.

The "data frequency" number indicates the frequency of the clock signal on line 116 from the frequency synthesizer 129 in the bit sync module 42.

The "bit error rate" number indicates the average number of errors in the frame synchronizing code word in the serial bit stream based on a sample of 100 code words.

The "bit sync status" word indicates whether the input buffer module 38 is in a lock mode or a search mode.

The "frame sync status" word indicates whether the sync control logic circuit 143 is in a lock mode or a search mode.

The "subframe sync status" word indicates whether the frame offset circuit 185 is in a lock mode or a search mode.

The "tape error message" indicates any one of a number of possible tape recorder errors, such as "no tape," "end of tape," "erroneous data on tape," and "no file."

The "file number" identifies the number of the file then being executed.

Display page 6 (FIG. 20) is displayed when selecting the locations in the parallel PCM digital data signal from which analog signals are to be provided to the analog output ports 25. The "analog output port" numbers in the left column are a permanent part of the page 6 display. For each of the twelve analog signal circuits (FIG. 8) corresponding to the twelve numbered analog output ports, programming indications are provided from the keyboard device 15 pertaining to the starting word and starting frame, the word increment and the frame increment. These program indications are stored in the latches 196, 197, 198, and 199 of the corresponding analog signal circuit.

Display page 7 (FIG. 21) provides a display of data from twelve selected locations in the distinguished digital data signal. Programming indications are provided by operation of the keyboard device 15 to identify the twelve data locations and also the upper and lower limits (in analog values) of the signal in the respective data locations. The "binary value" of the data in the selected locations is displayed. The displayed binary values are received from the PDP data modules 163 and 164 in the frame and subframe synchronizer 50 (FIG. 7). The data locations are stored in the latches 171 and 172 in the synchronizer 50. The "LIM" column indicates whether the received data is less than the lower limits, greater than the upper limits, or within the specified boundaries. The display " = " sign indicates the latter condition. If a data sample exceeds a specified limit, the indication of such condition displayed in the "LIM" column is retained even if the data sample later returns to within the specified limits.

Display page 8 (FIG. 22) also provides a display of data from twelve selected data channels. The programming indications pertaining to the "data locations" on page 8 are provided by the programming of display page 7. The displays of "binary value" and "LIM" are the same as are displayed on display page 7. The unique feature of display page 8 is the display of computed values derived from the microprocessor 250 showing the "decimal value" and the "percent of full scale" value.

Display page 9 (FIG. 23) provides a graphical representation of data from thirty two selected data locations in a bar-chart format. The data location and data increment programming indications are stored in latches 286, 287, 288, and 289 of the graph display module (FIG. 13). The indicated sample rate of "99" means that only one out of 99 repetitions is sampled. Display page 9 provides a graphic display of dynamic data and enables one to observe whether there is cross talk between data channels.

The "alarm indicator light" 22 on the front panel 11 (FIG. 1) is illustrated when the bit error rate is not within the specified limits, as discussed above with reference to display page 1; or when a tape error is indicated, as discussed above with reference to display page 5. The alarm indicator light 22 is also illuminated, when the bit rate of the received serial bit stream is not within the specified limits.

Having described my invention, I now claim:

1. A system contained in a single console for distinguishing a digital signal in a received serial bit stream signal, wherein said bits represent data in an original digital signal having a predetermined bit rate, a predetermined number of bits per word, and a predetermined number of words per frame, with there being a predetermined synchronizing code word in each frame for defining said frame, comprising processing means for processing said received signal to reconstruct said bits, to recognize said code word from said reconstructed bits, and to define said frames in response to recognition of said synchronizing code word, to thereby distinguish a digital signal having said predetermined number of bits per word, and said predetermined number of words per frame, keyboard means coupled to the processing means for enabling an operator to indicate said predetermined bit rate, said predetermined number of bits per word, said predetermined number of words per frame and said predetermined code word to the processing means for programming the processing means to distinguish said digital signal; and cathode ray tube means coupled to the processing means for providing an instant visual feedback from the processing means to said operator during operation of said keyboard, of said programming indications that are indicated to the processing means by operation of the keyboard means, and for providing a visual display of data represented by said distinguished digital signal.

2. A system according to claim 1, wherein the cathode ray tube means is coupled to the processing means for displaying said programming indications and said data in a multiple page format.

3. A system according to claim 1, further comprising tape recording means coupled to the processing means for recording said programming indications that are provided to the processing means by operation of the keyboard means.

4. A system according to claim 3, wherein the processing means include a random access memory for storing said programming indications that are provided to the processing means by operation of the keyboard means, and the tape recording means are coupled to the random access memory for recording said programming indications that are stored in the random access memory and/or for storing said recorded programming indications in the random access memory.

5. A system according to claim 1 wherein the means within the processing means for reconstructing said bits comprises amplifier means responsive to said received serial bit stream for providing a first reference signal having a level representative of the positive peak voltage of said bit stream, a second reference signal having a level representative of the negative peak voltage of said bit stream, and a third reference signal having a level that is the average of the levels of said first and second reference signals;

first comparator means for comparing each of said three reference signals with said received serial bit stream and for providing separate binary indications in response to each of said comparisons as to the relative levels of said reference signals with respect to said bit stream;

second comparator means for comparing two sets of said binary indications provided at two consecutive bit times clocked by a first clock signal having said predetermined bit rate;

gain adjusting means responsive to said comparison by said second comparator means for adjusting the gain of said amplifier means to adjust the voltage difference between said first and second reference signals to correspond to the voltage difference between said positive and negative peaks in said received serial bit stream that occur at said predetermined bit rate; and level adjusting means responsive to said comparison by said second comparator means for adjusting the levels of said first and second reference signals provided by said amplifier means to correspond to the levels of said positive and negative peaks in said received serial bit stream that occur at said predetermined bit rate;

whereby said bits in said received serial bit stream may be reconstructed from the binary indications provided from said comparison by the first comparison means of said third reference signal with said received serial bit stream.

6. A system according to claim 5, further including means for reconstructing a said received serial bit stream that is noise contaminated to be free of noise, said reconstructing means comprising first integrator means for separately and continuously integrating each of said three binary indications provided by the first comparator means over said predetermined bit period, with said integration being continuously updated in response to a second clock signal having a clock rate that is a predetermined multiple of said predetermined bit rate, wherein three separate integrated signals are provided;

logic means for continuously examining said three integrated signals and for providing a weighted binary output signal having a sign corresponding to the majority sign of said three integrated signals; and means for sampling said weighted binary output signal in response to said first clock signal at said predetermined bit rate for providing said noise free reconstructed serial bit stream.

7. A system according to claim 1, further including means for reconstructing a said received serial bit stream that is noise contaminated to be free of noise, said reconstructing means comprising amplifier means responsive to said received serial bit stream for providing a first reference signal having a level representative of the positive peak voltage of said bit stream, a second reference signal having a level representative of the negative peak voltage of said bit stream, and a third reference signal having a level that is the average of the levels of said first and second reference signals;

first comparator means for comparing each of said three reference signals with said received serial bit stream and for providing separate binary indications in response to each of said comparisons as to the relative levels of said reference signals with respect to said bit stream;

second comparator means for comparing two sets of said binary indications provided at two consecutive bit times clocked by a first clock signal having said predetermined bit rate;

gain adjusting means responsive to said comparison by said second comparator means for adjusting the gain of said amplifier means to adjust the voltage difference between said first and second reference signals to correspond to the voltage difference between said positive and negative peaks in said received serial bit stream that occur at said predetermined bit rate;

level adjusting means responsive to said comparison by said second comparator means for adjusting the levels of said first and second reference signals provided by said amplifier means to correspond to the levels of said positive and negative peaks in said received serial bit stream that occur at said predetermined bit rate;

first integrator means for separately and continuously integrating each of said three binary indications provided by the first comparator means over said predetermined bit period, with said integration being continuously updated in response to a second clock signal having a clock rate that is a predetermined multiple of said predetermined bit rate, wherein three separate integrated signals are provided;

logic means for continuously examining said three integrated signals and for providing a weighted binary output signal having a sign corresponding to the majority sign of said three integrated signals; and means for sampling said weighted binary output signal in response to said first clock signal at said predetermined bit rate for providing said noise free reconstructed serial bit stream.

8. A system according to claim 7, further including means for synchronizing said first clock signal with said reconstructed serial bit stream, said synchronizing means comprising phase detector means for detecting any difference in phase between said reconstructed serial bit stream and said first clock signal and for providing a phase error signal in response to said detected difference; and first clock means for generating said first clock signal in response to said second clock signal and for shifting the phase of said first clock signal in response to said phase error signal to be in phase with said reconstructed serial bit stream.

9. A system according to claim 8, wherein the phase detector means include means for detecting said phase difference by examining the sign of said integrated signal provided by said integration of said binary indication produced in response to said comparison of said third reference signal with said received serial bit stream upon each occurrence of a bit transition in said reconstructed serial bit stream.

10. A system according to claim 8, further including limiting means for limiting the rate at which said first clock means shifts the phase of said first clock signal, said limiting means comprising second integrator means for integrating said phase error signal over a predetermined duration to provide a limited phase error signal;

wherein the first clock means effects said phase shift in response to said limited phase error signal.

11. A system according to claim 10, further including locking means for locking the frequency of said first clock signal to the frequency of said reconstructed serial bit stream, said locking means comprising third integrator means for integrating said limited phase error signal over a given duration to provide an integrated phase error signal, means responsive to said integrated phase error signal for computing the bit rate of said reconstructed serial bit stream and for providing a bit rate indication signal for indicating said computed bit rate; and second clock means for generating said second clock signal in response to a reference frequency signal, wherein the second clock means responds to said bit rate indication signal to adjust the frequency of said second clock signal to be said predetermined multiple of said computed bit rate.

12. A system according to claim 8, further including locking means for locking the frequency of said first clock signal to the frequency of said reconstructed serial bit stream, said locking means comprising second integrator means for integrating said phase error signal over a given duration to provide an integrated phase error signal, means responsive to said integrated phase error signal for computing the bit rate of said reconstructed serial bit stream and for providing a bit rate indication signal for indicating said computed bit rate; and second clock means for generating said second clock signal in response to a reference frequency signal, wherein the second clock means responds to said bit rate indication signal to adjust the frequency of said second clock signal to be said predetermined multiple of said computed bit rate.

13. A system according to claim 1 wherein the means within the processing means for recognizing the predetermined synchronizing code word comprises, means for storing said predetermined code word having a given number of bits, means for registering said given number of consecutive bits in said reconstructed serial bit stream;

indicator means for comparing said stored code word with said registered bits and for providing an error indication of the number of bits positions where there is a disagreement between said code word and said registered bits;

comparator means for comparing said error indications and for storing any error indication that is lower than a previously provided error indication, wherein said comparator means provide a sync error pulse each time a said lower error indication is provided, word counter means for counting words at the predetermined number of bits per word rate in response to a bit clock signal providing bits at the predetermined bit rate, wherein a count of words is initiated in response to said sync error pulse, frame counter means for counting frames at the predetermined number of words per frame rate in response to a word count signal provided by the word counter means, wherein a frame pulse signal is provided upon counting each frame, with the comparator means responding to said frame sync pulse by clearing said lower indication from said storage, logic means responsive to said frame pulse signal and to said bit clock signal for defining a one bit duration window at the beginning of each frame and for examining whether said sync error pulse occurs within said window; wherein when said sync error pulse occurs within said window for a predetermined number of consecutive frames, said sync control logic means causes the counters to operate in a lock mode wherein said word count is not reinitiated in response to a sync error pulse accurring at some time other than in said window.

14. A system according to claim 13, wherein said sync control logic means causes the counters to cease operating in said lock mode when said sync error signal does not occur within said window for a predetermined number of consecutive frames.

15. A system for distinguishing a digital signal in a received serial bit stream signal, wherein said bits represent data in an original digital signal having a predetermined bit rate, characterized by means for reconstructing said bits comprising amplifier means responsive to said received serial bit stream for providing a first reference signal having a level representative of the positive peak voltage of said bit stream, a second reference signal having a level representative of the negative peak voltage of said bit stream, and a third reference signal having a level that is the average of the levels of said first and second reference signals;

first comparator means for comparing each of said three reference signals with said received serial bit stream and for providing separate binary indications in response to each of said comparisons as to the relative levels of said reference signals with respect to said bit stream;

second comparator means for comparing two sets of said binary indications provided at two consecutive bit times clocked by a first clock signal having said predetermined bit rate;

gain adjusting means responsive to said comparison by said second comparator means for adjusting the gain of said amplifier means to adjust the voltage difference between said first and second reference signals to correspond to the voltage difference between said positive and negative peaks in said received serial bit stream that occur at said predetermined bit rate; and level adjusting means responsive to said comparison by said second comparator means for adjusting the levels of said first and second reference signals provided by said amplifier means to correspond to the levels of said positive and negative peaks in said received serial bit stream that occur at said predetermined bit rate;

whereby said bits in said received serial bit stream may be reconstructed from the binary indications provided from said comparison by the first comparison means of said third reference signal with said received serial bit stream.

16. A system for distinguishing a digital signal in a received serial bit stream signal, wherein said bits represent data in an original digital signal having a predetermined bit rate, characterized by means for reconstructing a said received serial bit stream that is noise contaminated to be free of noise, said reconstructing means comprising amplifier means responsive to said received serial bit stream for providing a first reference signal having a level representative of the positive peak voltage of said bit stream, a second reference signal having a level representative of the negative peak voltage of said bit stream, and a third reference signal having a level that is the average of the levels of said first and second reference signals;

first comparator means for comparing each of said three reference signals with said received serial bit stream and for providing separate binary indications in response to each of said comparisons as to the relative levels of said reference signals with respect to said bit stream;

second comparator means for comparing two sets of said binary indications provided at two consecutive bit times clocked by a first clock signal having said predetermined bit rate;

gain adjusting means responsive to said comparison by said second comparator means for adjusting the gain of said amplifier means to adjust the voltage difference between said first and second reference signals to correspond to the difference between said positive and negative peaks in said received serial bit stream that occur at said predetermined bit rate;

level adjusting means responsive to said comparison by said second comparator means for adjusting the levels of said first and second reference signals provided by said amplifier means to correspond to the levels of said positive and negative peaks in said received serial bit stream that occur at said predetermined bit rate;

first integrator means for separately and continuously integrating each of said three binary indications provided by the first comparator means over said predetermined bit period, with said integration being continuously updated in response to a second clock signal having a clock rate that is a predetermined multiple of said predetermined bit rate, wherein three separate integrated signals are provided;

logic means for continuously examining said three integrated signals and for providing a weighted binary output signal having a sign corresponding to the majority sign of said three integrated signals; and means for sampling said weighted binary output signal in response to said first clock signal at said predetermined bit rate for providing said noise free reconstructed serial bit stream.

17. A system according to claim 16, further including means for synchronizing said first clock signal with said reconstructed serial bit stream, said synchronizing means comprising phase detector means for detecting any difference in phase between said reconstructed serial bit stream and said first clock signal and for providing a phase error signal in response to said detected difference; and first clock means for generating said first clock signal in response to said second clock signal and for shifting the phase of said first clock signal in response to said phase error signal to be in phase with said reconstructed serial bit stream.

18. A system according to claim 17, wherein the phase detector means include means for detecting said phase difference by examining the sign of said integrated signal provided by said integration of said binary indication produced in response to said comparison of said third reference signal with said received serial bit stream upon each occurrence of a bit transition in said reconstructed serial bit stream.

19. A system according to claim 17, further including limiting means for limiting the rate at which said first clock means shifts the phase of said first clock signal, said limiting means comprising second integrator means for integrating said phase error signal over a predetermined duration to provide a limited phase error signal;

wherein the first clock means effects said phase shift in response to said limited phase error signal.

20. A system according to claim 19, further including locking means for locking the frequency of said first clock signal to the frequency of said reconstructed serial bit stream, said locking means comprising;

third integrator means for integrating said limited phase error signal over a given duration to provide an integrated phase error signal, means responsive to said integrated phase error signal for computing the bit rate of said reconstructed serial bit stream and for providing a bit rate indication signal for indicating said computed bit rate; and second clock means for generating said second clock signal in response to a reference frequency signal, wherein the second clock means responds to said bit rate indication signal to adjust the frequency of said second clock signal to be said predetermined multiple of said computed bit rate.

21. A system according to claim 17, further including locking means for locking the frequency of said first clock signal to the frequency of said reconstructed serial bit stream, said locking means comprising second integrator means for integrating said phase error signal over a given duration to provide an integrated phase error signal, means responsive to said integrated phase error signal for computing the bit rate of said reconstructed serial bit stream and for providing a bit rate indication signal for indicating said computed bit rate; and second clock means for generating said second clock signal in response to a reference frequency signal, wherein the second clock means responds to said bit rate indication signal to adjust the frequency of said second clock signal to be said predetermined multiple of said computed bit rate.

22. A system for distinguishing a digital signal in a received serial bit stream signal, wherein said bits represent data in an original digital signal having a predetermined bit rate, a predetermined number of bits per word, and a predetermined number of words per frame, with there being a predetermined synchronizing code word in each frame for defining said frame, comprising processing means for processing said received signal to reconstruct said bits, to recognize said code word from said reconstructed bits, and to define said frames in response to recognition of said synchronizing code word, to thereby distinguish a digital signal having said predetermined number of bits per word, and said predetermined number of words per frame;

wherein the means within the processing means for recognizing said predetermined synchronizing code word comprises means for storing said predetermined code word having a given number of bits, means for registering said given number of consecutive bits in said recognized serial bit stream;

indicator means for comparing said stored code word with said registered bits and for providing an error indication of the number of bit positions where there is disagreement between said code word and said registered bits;

comparator means for comparing said error indications and for storing any error indication that is lower than a previously provided error indication, wherein said comparator means provide a sync error pulse each time a said lower error indication is provided, word counter means for counting words at the predetermined number of bits per word rate in response to a bit clock signal providing bits at the predetermined bit rate, wherein a count of words is initiated in response to said sync error pulse, frame counter means for counting frames at the predetermined number of words per frame rate in response to a word count signal provided by the word counter means, wherein a frame pulse signal is provided upon counting each frame, with the comparator means responding to said frame sync pulse by clearing said lower indication from said storage, logic means responsive to said frame pulse signal and to said bit clock signal for defining a one bit duration window at the beginning of each frame and for examining whether said sync error pulse occurs within said window; wherein when said sync error pulse occurs within said window for a predetermined number of consecutive frames, said sync control logic means causes the counters to operate in a lock mode wherein said word count is not reinitiated in response to a sync error pulse occurring at some time other than in said window.

23. A system according to claim 22, wherein said sync control logic means causes the counters to cease operating in said lock mode when said sync error signal does not occur within said window for a predetermined number of consecutive frames.

* * * * *